(12) United States Patent
Farnsworth et al.

(10) Patent No.: US 10,665,875 B2
(45) Date of Patent: May 26, 2020

(54) PATH CONTROL CONCEPT

(71) Applicant: Toyota Motor Engineering & Manufacturing North America, Inc., Erlanger, KY (US)

(72) Inventors: Jared Farnsworth, Roseville, CA (US); Daniel Folick, Long Beach, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 378 days.

(21) Appl. No.: 15/836,740

(22) Filed: Dec. 8, 2017

(65) Prior Publication Data
US 2019/0181464 A1 Jun. 13, 2019

(51) Int. Cl.
*H01M 8/04089* (2016.01)
*H01M 8/04992* (2016.01)
*H01M 8/04746* (2016.01)

(52) U.S. Cl.
CPC ... *H01M 8/04089* (2013.01); *H01M 8/04776* (2013.01); *H01M 8/04992* (2013.01); *B60L 2240/14* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 6,442,455 B1 | 8/2002 | Kotre et al. | |
| 6,480,767 B2 | 11/2002 | Yamaguchi et al. | |
| 6,635,374 B1 | 10/2003 | Aramaki | |
| 6,847,188 B2 | 1/2005 | Keskula et al. | |
| 6,924,050 B2 | 8/2005 | Lahiff | |
| 6,936,359 B2 | 8/2005 | Kobayashi et al. | |
| 7,117,078 B1 | 10/2006 | Gangopadhyay | |
| 7,124,040 B2 | 10/2006 | Engelhardt et al. | |

(Continued)

FOREIGN PATENT DOCUMENTS

| | | |
|---|---|---|
| CN | 202065044 | 12/2011 |
| CN | 202930480 | 8/2013 |

(Continued)

OTHER PUBLICATIONS

Pablo Guinta et al.; "Calculation of Multiplicity of Steady States in a Catalyst Pellet by Homotopic Continuation Method"; AIChE Journal; (40 pages).

*Primary Examiner* — Sarah A. Slifka
(74) *Attorney, Agent, or Firm* — Snell & Wilmer LLP

(57) ABSTRACT

A system includes a compressor to pump a gas at a compressor flow rate, and a fuel cell stack that receives the gas. The system also includes a memory to store a compressor flow map corresponding to a desirable progression shape of the compressor flow rate from a starting compressor flow rate to a target compressor flow rate over a period of time. The system also includes an ECU to determine or receive a control signal corresponding to a final target compressor flow rate and to determine the starting compressor flow rate. The ECU also determines an intermediate target compressor flow rate using the compressor flow map based on the final target compressor flow rate, the starting compressor flow rate, and an amount of time since determining or receiving the control signal, and controls the compressor based on the intermediate target compressor flow rate.

20 Claims, 24 Drawing Sheets

(56) References Cited

U.S. PATENT DOCUMENTS

| | | |
|---|---|---|
| 7,141,326 B2 | 11/2006 | Kobayashi et al. |
| 7,247,401 B2 | 7/2007 | Aberle et al. |
| 7,348,082 B2 | 3/2008 | Kolodziej |
| 7,353,900 B2 | 4/2008 | Abe et al. |
| 7,608,011 B2 | 10/2009 | Grabowski et al. |
| 7,612,532 B2 | 11/2009 | Verbrugge |
| 7,682,717 B2 | 3/2010 | Ueda et al. |
| 7,682,719 B2 | 3/2010 | Lienkamp et al. |
| 7,687,164 B2 | 3/2010 | Frost et al. |
| 7,845,187 B2 | 12/2010 | Patel et al. |
| 7,919,211 B2 | 4/2011 | Nonobe et al. |
| 8,044,534 B2 | 10/2011 | Kojima et al. |
| 8,141,356 B2 | 3/2012 | Leone et al. |
| 8,153,321 B2 | 4/2012 | Katano |
| 8,215,428 B2 | 7/2012 | Lee et al. |
| 8,293,413 B2 | 10/2012 | Bono |
| 8,342,275 B2 | 1/2013 | Ojima et al. |
| 8,394,542 B2 | 3/2013 | Elwart et al. |
| 8,486,574 B2 | 7/2013 | Jenings |
| 8,498,766 B2 | 7/2013 | Takahashi et al. |
| 8,561,453 B2 | 10/2013 | Hobmeyr et al. |
| 8,568,935 B2 | 10/2013 | Arthur et al. |
| 8,673,515 B2 | 3/2014 | Harris et al. |
| 8,684,117 B2 | 4/2014 | Ptacek et al. |
| 8,691,456 B2 | 4/2014 | Choe et al. |
| 8,715,875 B2 | 5/2014 | Chan et al. |
| 8,722,263 B2 | 5/2014 | Cai et al. |
| 8,754,392 B2 | 6/2014 | Caimi et al. |
| 8,757,223 B2 | 6/2014 | Uemura |
| 8,796,984 B2 | 8/2014 | Yoshida et al. |
| 8,846,262 B2 | 9/2014 | Mussro et al. |
| 8,920,995 B2 | 12/2014 | Lebzelter et al. |
| 8,935,029 B2 | 1/2015 | Sabrie et al. |
| 8,951,685 B2 | 2/2015 | Aso et al. |
| 8,956,778 B2 | 2/2015 | Zhang et al. |
| 8,962,208 B2 | 2/2015 | Mussro et al. |
| 8,986,899 B2 | 3/2015 | Harris et al. |
| 8,997,771 B2 | 4/2015 | Lee et al. |
| 9,002,568 B2 | 4/2015 | Datta et al. |
| 9,005,785 B2 | 4/2015 | Alp et al. |
| 9,021,824 B2 | 5/2015 | Koo et al. |
| 9,099,701 B2 | 8/2015 | Maslyn et al. |
| 9,187,009 B2 | 11/2015 | Jeon et al. |
| 9,242,532 B2 | 1/2016 | Kim et al. |
| 9,242,573 B2 | 1/2016 | Lee et al. |
| 9,281,532 B2 | 3/2016 | Lebzelter et al. |
| 9,281,533 B2 | 3/2016 | Ozawa et al. |
| 9,312,549 B2 | 4/2016 | Tachibana et al. |
| 9,318,778 B2 | 4/2016 | Wahlstrom et al. |
| 9,358,900 B2 | 6/2016 | Wake et al. |
| 9,437,884 B2 | 9/2016 | Kolodziej |
| 9,457,640 B2 | 10/2016 | Ikeya |
| 9,472,818 B2 | 10/2016 | Kilmer |
| 9,527,404 B2 | 12/2016 | Gauthier et al. |
| 9,531,019 B2 | 12/2016 | Jeon |
| 9,590,259 B2 | 3/2017 | Toida |
| 9,614,236 B2 | 4/2017 | Yu et al. |
| 9,620,796 B2 | 4/2017 | Tomita et al. |
| 9,620,799 B2 | 4/2017 | Igarashi et al. |
| 9,643,517 B2 | 5/2017 | Watanabe et al. |
| 2003/0105562 A1 | 6/2003 | Hsiao et al. |
| 2004/0018399 A1 | 1/2004 | Jung |
| 2006/0134472 A1 | 6/2006 | Bach et al. |
| 2008/0286622 A1 | 11/2008 | Shaw et al. |
| 2009/0050082 A1 | 2/2009 | Iwasaki |
| 2011/0214930 A1 | 9/2011 | Betts et al. |
| 2012/0129059 A1 | 5/2012 | Ohashi |
| 2014/0000859 A1 | 1/2014 | Abihana |
| 2014/0000862 A1 | 1/2014 | Abihana et al. |
| 2014/0103128 A1 | 4/2014 | Patel et al. |
| 2014/0120440 A1 | 5/2014 | Nolan et al. |
| 2014/0335432 A1 | 11/2014 | Sinha et al. |
| 2014/0342253 A1 | 11/2014 | Lee et al. |
| 2014/0370412 A1 | 12/2014 | Sumser et al. |
| 2015/0188157 A1 | 7/2015 | Na et al. |
| 2016/0006049 A1 | 1/2016 | Kwon et al. |
| 2016/0137096 A1 | 5/2016 | Oda et al. |
| 2016/0141645 A1 | 5/2016 | Yamada et al. |
| 2016/0141661 A1 | 5/2016 | Kim et al. |
| 2016/0141666 A1 | 5/2016 | Shim et al. |
| 2016/0153367 A1 | 6/2016 | Yoon |
| 2016/0172696 A1 | 6/2016 | Milacic et al. |
| 2016/0211536 A1 | 7/2016 | Kwon et al. |
| 2016/0336607 A1 | 11/2016 | Lee et al. |
| 2016/0359181 A1 | 12/2016 | Lee |
| 2016/0372768 A1 | 12/2016 | Proctor et al. |
| 2017/0012310 A1 | 1/2017 | Han et al. |
| 2017/0047603 A1 | 2/2017 | Kazuno |
| 2017/0092972 A1 | 3/2017 | Pence |
| 2017/0162885 A1 | 6/2017 | Kim |
| 2017/0179511 A1 | 6/2017 | Jung et al. |

FOREIGN PATENT DOCUMENTS

| | | |
|---|---|---|
| CN | 105895941 | 8/2016 |
| DE | 102012224052 | 6/2014 |
| GB | 2533015 | 6/2016 |
| JP | 2005347008 | 12/2005 |
| KR | 100863649 | 6/2007 |
| WO | WO2005078257 | 8/2005 |
| WO | WO2013073457 | 5/2013 |

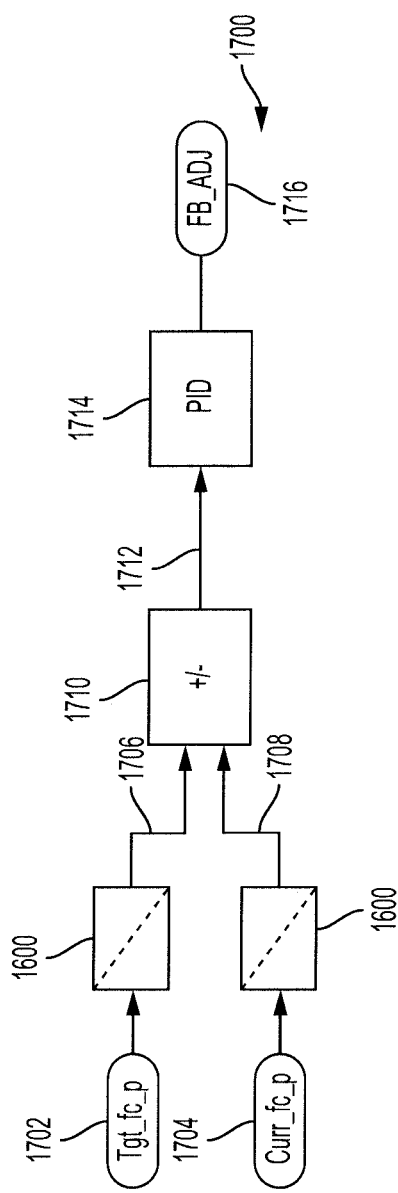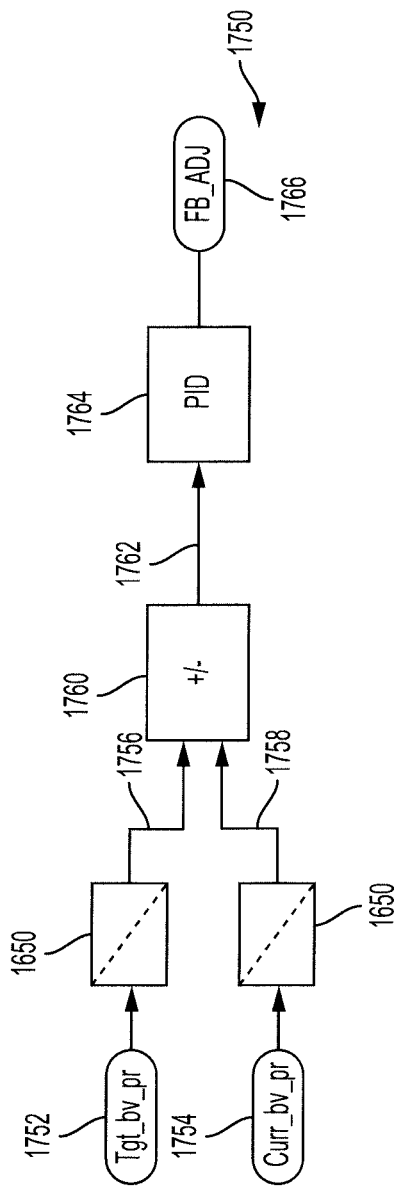

PATH CONTROL CONCEPT

BACKGROUND

1. Field

The present disclosure relates to systems and methods for controlling pressure and airflow values of air flowing through a fuel cell circuit by estimating the pressure and airflow values, identifying a desirable path for the pressure and airflow values, and feedforward and feedback control of actuators to achieve the desirable path of the pressure and airflow values.

2. Description of the Related Art

Due to a combination of state and federal regulations, along with a desire to reduce pollution, there has been a recent push for vehicle manufacturers to design fuel-efficient vehicles that have relatively low levels of harmful emissions. Automobile manufacturers have discovered multiple solutions to reducing these harmful emissions. One such solution is hybrid vehicles that include an engine, as well as a battery for storing energy and a motor-generator for powering the vehicle using the electricity. Another solution is fully electronic vehicles that include only a battery and a motor-generator that powers the vehicle using energy stored in the battery. Yet another solution is fuel cell vehicles that include fuel cells that generate electricity via a chemical reaction.

Many fuel cell vehicles include one or more fuel cell stack that includes multiple fuel cells. The fuel cells may receive a fuel, which typically includes hydrogen, along with oxygen or another oxidizing agent. The fuel cell stack may facilitate a chemical reaction between the hydrogen and oxygen. This chemical reaction generates electricity. The main emissions are air and water, which are relatively harmless. The electricity generated by the fuel cell stack may be stored in a battery or directly provided to a motor-generator to generate mechanical power to propel the vehicle. While fuel cell vehicles are an exciting advance in the automobile industry, the technology is relatively new, providing space for improvements to the technology.

Many fuel cells receive the oxygen from air. However, the amount of oxygen (i.e., air) required varies based on a desired power output of the fuel cells. The pressure of the air within the fuel cells likewise varies based on the desired power output of the fuel cells. The desired power output is variable and is based on a power request from a driver, or an electronic control unit if the vehicle is an autonomous or semi-autonomous vehicles.

Thus, there is a need in the art for systems and methods for accurately and quickly providing air at a desirable rate and a desirable pressure to the fuel cells.

SUMMARY

Described herein is a system for controlling airflow through a fuel cell circuit. The system includes a compressor designed to pump a gas through the fuel cell circuit at a compressor flow rate. The system also includes a fuel cell stack having a plurality of fuel cells that are designed to receive the gas and to generate electricity via a chemical reaction with the gas. The system also includes a memory designed to store a compressor flow map corresponding to a desirable progression shape of the compressor flow rate from a starting compressor flow rate to a target compressor flow rate over a period of time. The system also includes an electronic control unit (ECU) coupled to the compressor. The ECU is designed to determine or receive a control signal corresponding to a final target compressor flow rate, and to determine the starting compressor flow rate. The ECU is also designed to determine an intermediate target compressor flow rate using the compressor flow map based on the final target compressor flow rate, the starting compressor flow rate, and an amount of time since determining or receiving the control signal. The ECU is also designed to control the compressor based on the intermediate target compressor flow rate.

Also described is a system for controlling airflow through a fuel cell circuit. The system includes a plurality of actuators designed to adjust a flow rate and a pressure of a gas within the fuel cell circuit. The system also includes a fuel cell stack having a plurality of fuel cells and designed to receive the gas and to generate electricity via a chemical reaction with the gas. The system also includes a memory designed to store a reference state map corresponding to a desirable progression shape of a reference state of the fuel cell circuit over a period of time, the reference state corresponding to at least one of the flow rate or the pressure of the gas, and a follower state map corresponding to a desirable progression shape of a follower state of the fuel cell circuit over a completion percentage of the reference state, the follower state corresponding to at least one of the flow rate or the pressure of the gas. The system also includes an electronic control unit (ECU) coupled to the plurality of actuators and the memory. The ECU is designed to determine or receive a target reference state value and a target follower state value, and determine a starting reference state value and a starting follower state value. The ECU is also designed to determine an intermediate target reference state value based on the reference state map, an amount of time elapsed since the target reference state value was determined or received, the target reference state value, and the starting reference state value. The ECU is also designed to determine an intermediate target follower state value based on the follower state map, the completion percentage of the reference state, the target follower state value, and the starting follower state value.

Also described is a method for controlling airflow through a fuel cell circuit. The method includes storing, in a memory, a compressor flow map corresponding to a desirable progression shape of a compressor flow rate of a compressor from a starting compressor flow rate to a target compressor flow rate over a period of time. The method also includes determining or receiving, by an electronic control unit (ECU), a control signal corresponding to a final target compressor flow rate. The method also includes determining, by the ECU, the starting compressor flow rate. The method also includes determining, by the ECU, an intermediate target compressor flow rate using the compressor flow map based on the final target compressor flow rate, the starting compressor flow rate, and an amount of time since determining or receiving the control signal. The method also includes controlling, by the ECU, the compressor based on the intermediate target compressor flow rate.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIGS. 17A and 17B are block diagrams illustrating control circuits for implementing the method of FIGS. 16A and 16B according to an embodiment of the present invention;

DETAILED DESCRIPTION

The present disclosure describes systems and methods for controlling actuators of a fuel-cell circuit based on final target flow and pressure values throughout the fuel-cell circuit. In particular, the systems set intermediate pressure and flow targets by selecting one flow value or one pressure value as a reference state, and the remaining flow and pressure values as follower states that are controlled based on progression of the reference state. This beneficially links all state changes within the system together, such that all states change together in a desired pattern. This is advantageous because it ensures that the combination of flow and pressure ratio across the compressor never reaches a stall or a surge state, which can be harmful to the compressor and other components. The system further uses a relatively small number of state maps and interpolates between the maps based on current state values, which provides the benefit of reduced memory usage of the system.

An exemplary system includes a compressor that pumps air through the system, and a fuel cell stack that receives the air. The system also includes a memory that stores a reference state map that plots desirable progression of a reference state (such as a flow or pressure value) over a period of time, along with a follower state map that plots desirable progression of a follower state (such as another flow or pressure value) based on a completion percent of the reference state from a starting state to the target. The system also includes an electronic control unit (ECU) that may determine target state values and control the reference and follower state to progress towards the target values by following the progression patterns of the maps.

Figure 1:
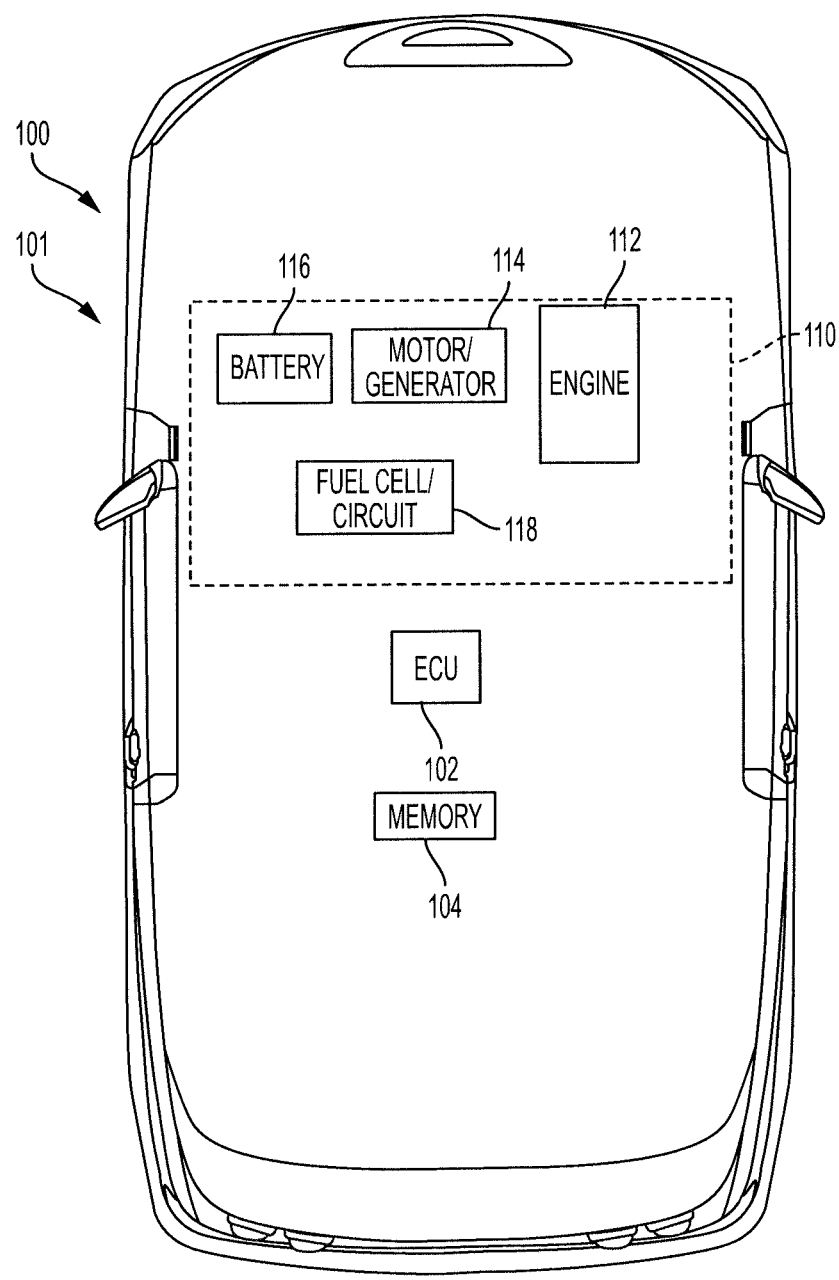
FIG. 1 is a block diagram illustrating various components of a vehicle having a fuel cell circuit capable of generating electricity based on a chemical reaction according to an embodiment of the present invention.

Turning to FIG. 1, a vehicle 100 includes components of a system 101 for providing gas, such as air, to fuel cells. In particular, the vehicle 100 and system 101 include an ECU 102 and a memory 104. The vehicle 100 further includes a power source 110 which may include at least one of an engine 112, a motor-generator 114, a battery 116, or a fuel cell circuit 118. The fuel cell circuit 118 may be a part of the system 101.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

In some embodiments, the vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination.

The memory 104 may include any non-transitory memory known in the art. In that regard, the memory 104 may store machine-readable instructions usable by the ECU 102 and may store other data as requested by the ECU 102 or programmed by a vehicle manufacturer or operator. The memory 104 may store a model of the fuel cell circuit 118. The model may include equations or other information usable to estimate various parameters of the fuel cell circuit 118.

The engine 112 may convert a fuel into mechanical power. In that regard, the engine 112 may be a gasoline engine, a diesel engine, or the like.

The battery 116 may store electrical energy. In some embodiments, the battery 116 may include any one or more energy storage device including a battery, a fly-wheel, a super-capacitor, a thermal storage device, or the like.

The fuel cell circuit 118 may include a plurality of fuel cells that facilitate a chemical reaction to generate electrical energy. For example, the fuel cells may receive hydrogen and oxygen, facilitate a reaction between the hydrogen and oxygen, and output electricity in response to the reaction. In that regard, the electrical energy generated by the fuel cell circuit 118 may be stored in the battery 116. In some embodiments, the vehicle 100 may include multiple fuel cell circuits including the fuel cell circuit 118.

The motor-generator 114 may convert the electrical energy stored in the battery (or electrical energy received directly from the fuel cell circuit 118) into mechanical power usable to propel the vehicle 100. The motor-generator 114 may further convert mechanical power received from the engine 112 or wheels of the vehicle 100 into electricity, which may be stored in the battery 116 as energy and/or used by other components of the vehicle 100. In some embodiments, the motor-generator 114 may also or instead include a turbine or other device capable of generating thrust.

Figure 2:
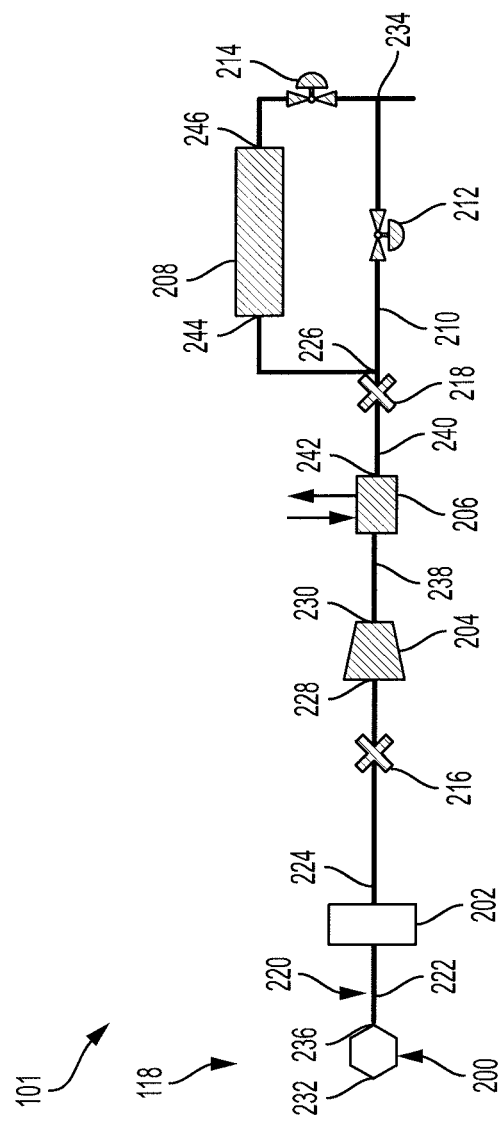
FIG. 2 is a block diagram illustrating various features of the fuel cell circuit of FIG. 1 according to an embodiment of the present invention.

Turning now to FIG. 2, additional details of the fuel cell circuit 118 are illustrated. In particular, the fuel cell circuit 118 includes an air intake 200, an air cleaner 202, a compressor 204, an intercooler 206, a fuel cell stack 208, a bypass branch 210, a bypass valve 212 positioned along the bypass branch 210, and a restriction valve 214.

The air intake 200 may receive air from an ambient environment, such as outside of the vehicle 100 of FIG. 1. In some embodiments, the air intake 200 may include a filter for filtering debris from the received air. The air cleaner 202 may include a filter or other device capable of removing debris and other impurities from the air received from the air intake 200.

The compressor 204 may be a turbo compressor or other compressor capable of pressurizing air. In that regard, the compressor 204 may draw air from the cleaner 202 and may output pressurized air.

Figure 3:
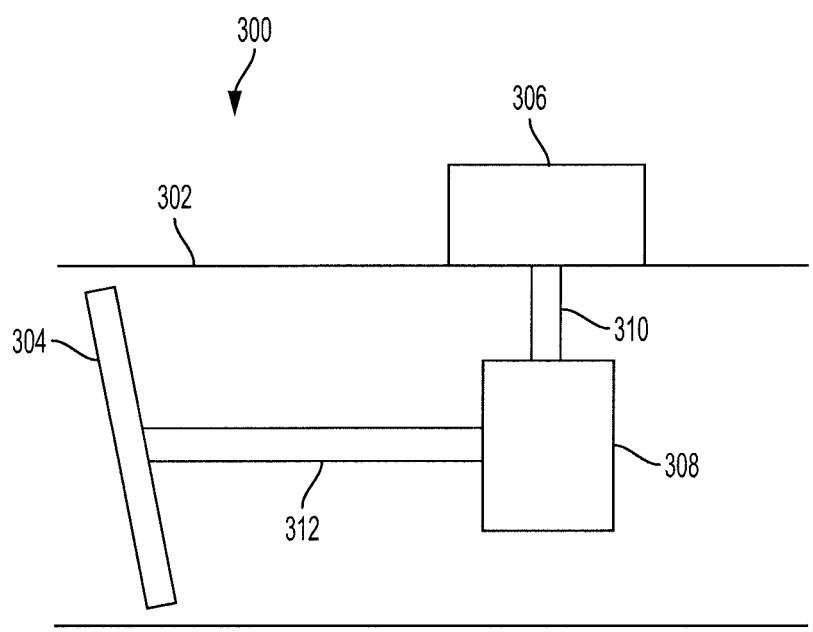
FIG. 3 is cross-sectional view of an exemplary compressor for use in a fuel cell circuit according to an embodiment of the present invention.

With brief reference to FIG. 3, an exemplary compressor 300 may be used as the compressor 204 of FIG. 2. In particular, the compressor 300 includes a body 302 through which air may be drawn. An impeller 304, which may include a plurality of airfoils, may be located inside of the body 302. A motor 306 (or other torque source) may generate mechanical power having a torque at a rotational speed, which may be received by a gearbox 308 via a shaft 310. The gearbox 308 may convert the power received from the motor 306 into power having a different torque and rotational speed. The mechanical power from the gearbox 308 may be applied to the impeller 304 via the shaft 312. The pressure of the gas output by the compressor 300 may be dependent upon the torque and speed of the mechanical power applied to the impeller 304.

Returning reference to FIG. 2, the fuel cell circuit 118 may further include an intercooler 206. The intercooler 206 may receive the air from the compressor 204 and may also receive a fluid, such as a coolant. The intercooler 206 may transfer heat from the air to the coolant, or may transfer heat from the coolant to the air. In that regard, the intercooler 206 may adjust a temperature of the air flowing through the fuel cell circuit 118.

The fuel cell stack 208 may include a plurality of fuel cells. The fuel cells may receive hydrogen along with the air from the intercooler 206. The fuel cells may facilitate a chemical reaction between the oxygen in the air and the hydrogen, which may generate electricity.

The air from the intercooler 206 may be split such that some of the air flows through the fuel cell stack 208 and some of the air flows through the bypass branch 210. In that regard, the air flowing through the bypass branch 210 fails to flow through the fuel cell stack 208. The bypass valve 212 may have an adjustable valve position. The adjustable valve position of the bypass valve 212 may be controlled to adjust an amount of airflow through the bypass branch 210 and, likewise, to adjust an amount of airflow through the fuel cell stack 208. For example, when the bypass valve 212 is 100 percent (100%) closed then all of the airflow through the fuel cell circuit 118 flows through the fuel cell stack 208.

Although discussion may reference airflow through the fuel cell circuit 118, one skilled in the art will realize that any other gas flow may be substituted for the airflow without departing from the scope of the present disclosure.

The restriction valve 214 may likewise have an adjustable valve position. The adjustable valve position of the restriction valve 214 may be controlled to adjust a pressure of the air within the fuel cell stack 208. For example, the pressure within the fuel cell stack 208 may be increased by closing the restriction valve 214, and may be decreased by opening the restriction valve 214.

Referring to FIGS. 1 and 2, each of the compressor 204, the bypass valve 212, and the restriction valve 214 may be considered actuators and may be controlled by the ECU 102. For example, the ECU 102 may receive a power request from a driver of the vehicle (or may generate a power request in an autonomous or semi-autonomous vehicle). The ECU 102 may convert the power request into desirable pressure or flow values corresponding to desirable pressure or airflow at specific locations within the fuel cell circuit 118. The ECU 102 may then control each of the compressor 204, the bypass valve 212, and the restriction valve 214 in order to achieve the desirable pressure or flow values.

The fuel cell circuit 118 may further include a flow sensor 216 and a pressure sensor 218. The flow sensor 216 may detect a flow of the gas (such as a mass flow) through the compressor 204. The pressure sensor 218 may detect a pressure of the gas at an outlet of the intercooler 206.

The fuel cell circuit 118 may further include a plurality of pipes 220. For example, the plurality of pipes 220 may include a first pipe 222 that transfers the gas from the intake 200 to the air cleaner 202, and a second pipe 224 that transfers the gas from the air cleaner 202 to the flow sensor 216. In some embodiments, two or more of the intake 200, the air cleaner 202, or the flow sensor 216 may be directly connected without any pipes.

Figure 4:
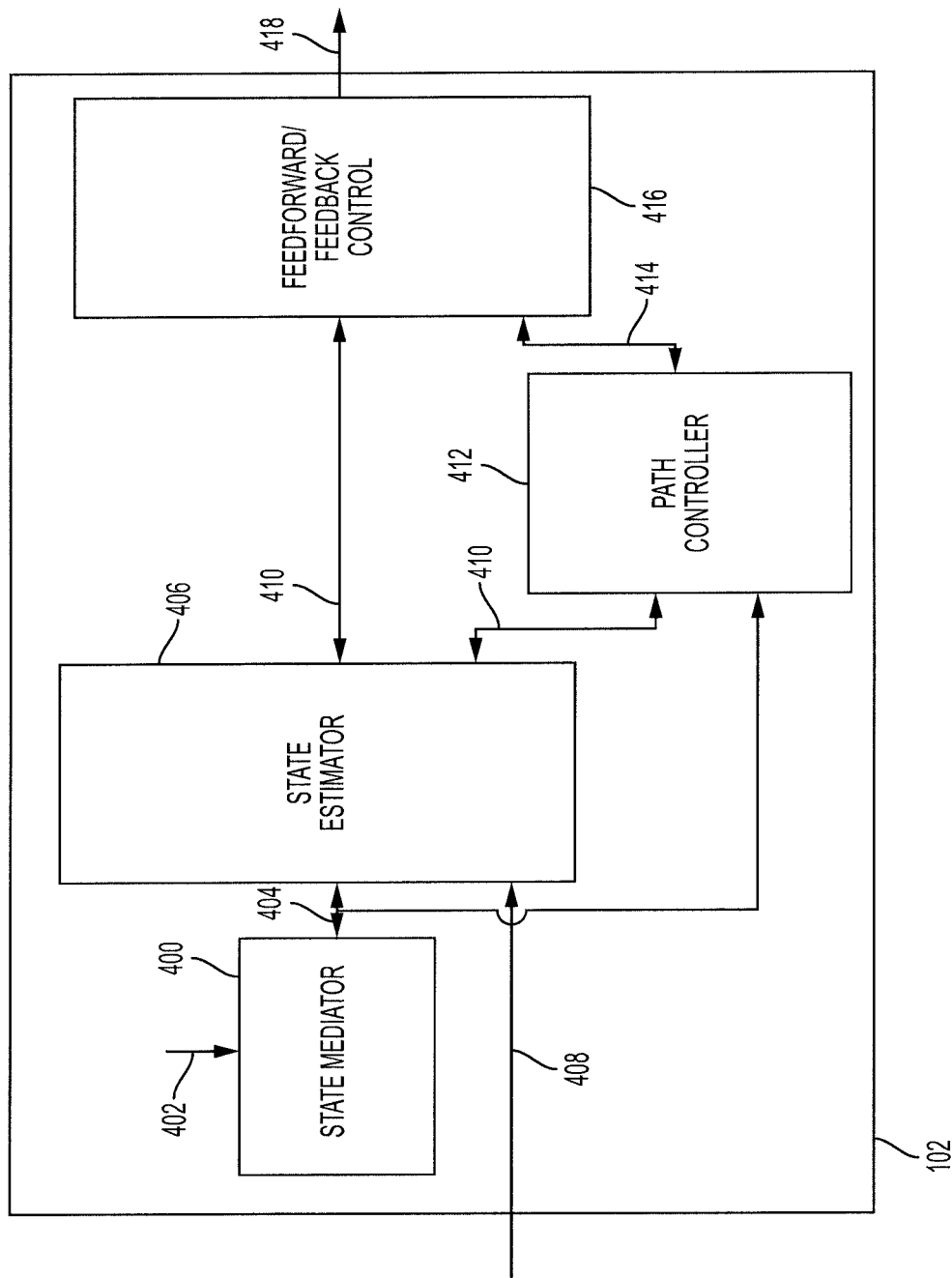
FIG. 4 is a block diagram illustrating various logic components of an electronic control unit (ECU) of the vehicle of FIG. 1 for providing a gas to the fuel cell circuit at a desirable flow rate and pressure according to an embodiment of the present invention.
Figure 5A:
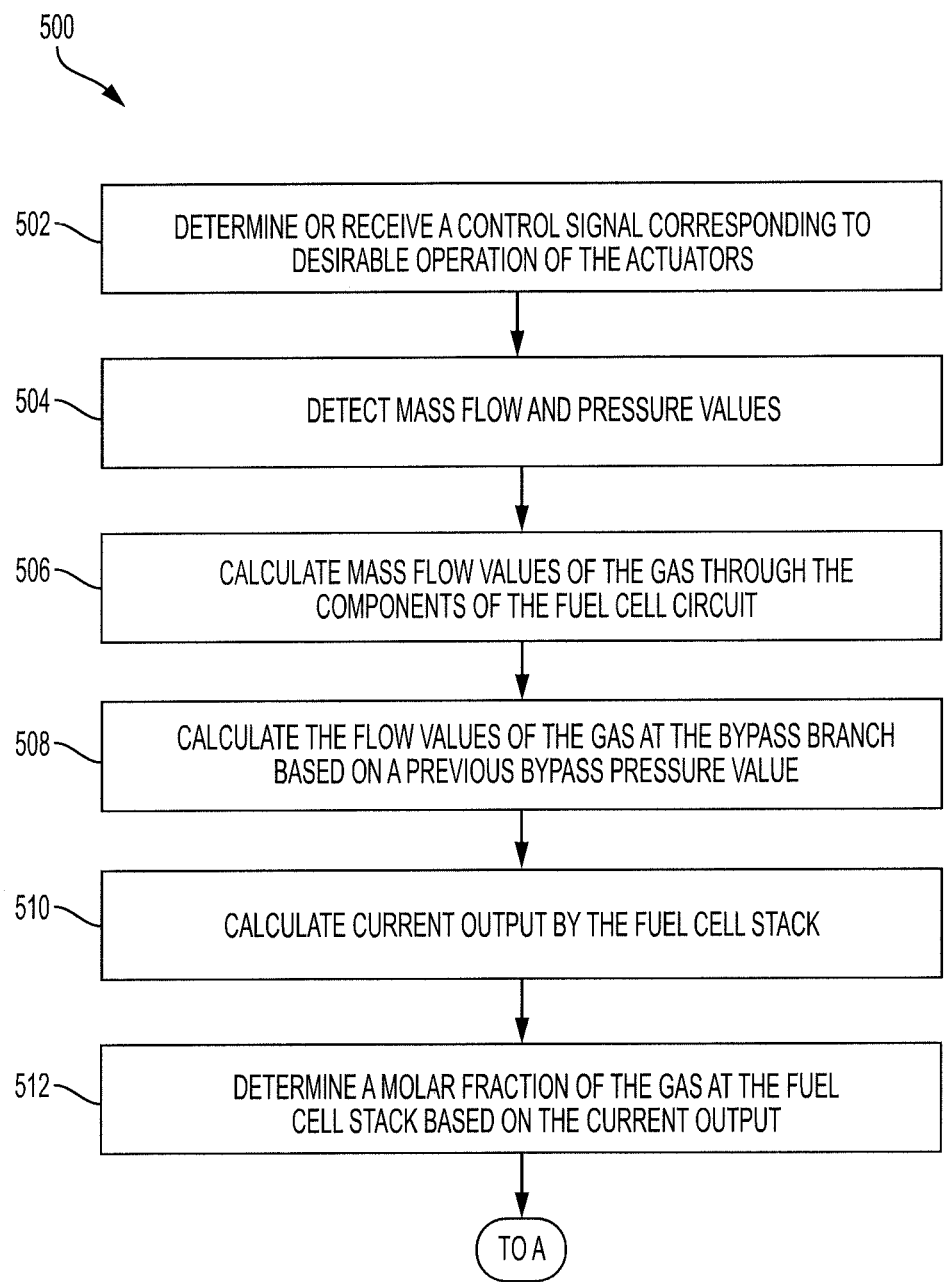
FIGS. 5A and 5B are flowcharts illustrating a method for estimating pressure and flow values for multiple components of a fuel cell circuit according to an embodiment of the present invention.
Figure 5B:
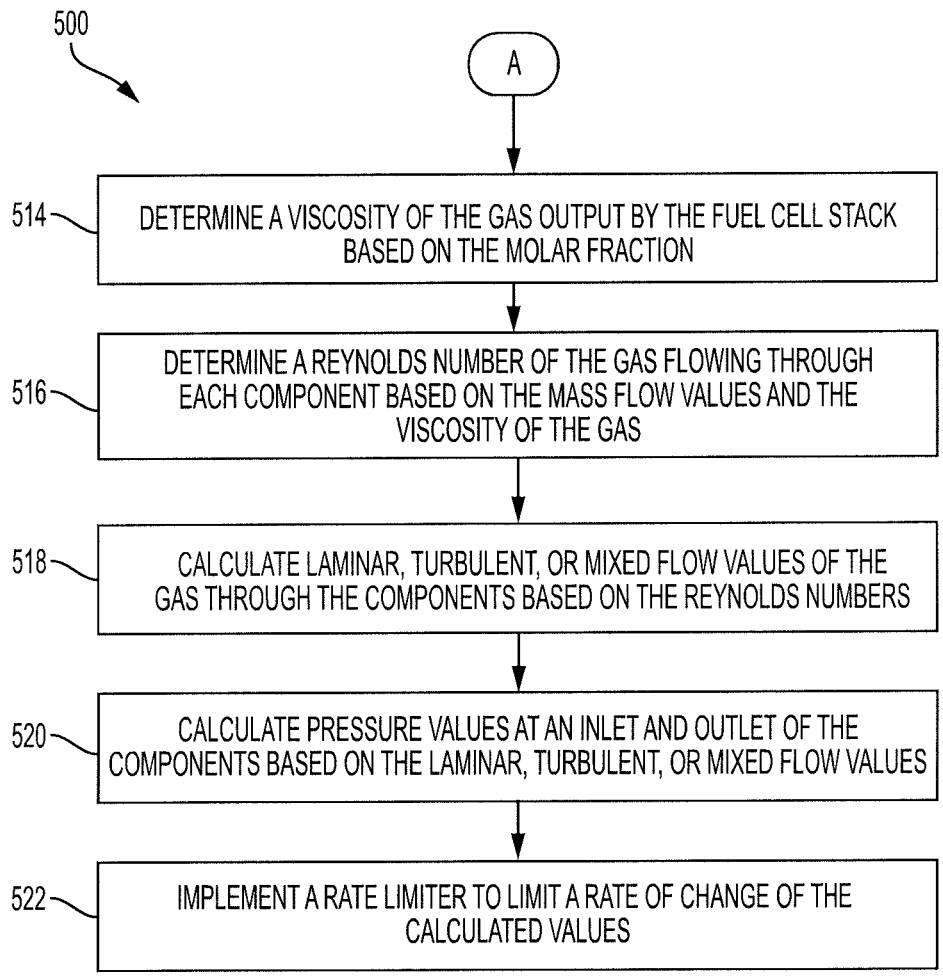

Referring now to FIGS. 2 and 4, the ECU 102 may include various processes or functions for controlling the fuel cell circuit 118. The processes or functions within the ECU 102 may each be implemented in hardware (i.e., performed by a dedicated hardware), may be implemented in software (i.e., a general purpose ECU running software stored in a memory), or may be implemented via a combination of hardware and software.

In particular, the ECU 102 may include a state mediator 400. The state mediator 400 may receive a control signal 402 corresponding to desirable pressure and/or flow values (i.e., at least one target pressure value or at least one target flow value). The control signal 402 may likewise correspond to a power request. The state mediator 400 may analyze the target pressure and flow values and determine whether the target values are feasible based on the mechanics of the fuel cell circuit 118 and whether one or more component of the fuel cell circuit 118 is likely to become damaged in an attempt to meet a target value. The state mediator 400 may then output mediated target values 404.

The ECU 102 may further include a state estimator 406. The state estimator 406 may receive the mediated target values 404 along with sensor data 408 detected by the flow sensor 216 and the pressure sensor 218. The state estimator 406 may calculate or estimate current pressure values and flow values corresponding to each component of the fuel cell circuit 118 (including the plurality of pipes 220). The state estimator 406 may output the current estimated values 410. In some embodiments, the state estimator 406 may also determine or adjust the mediated target values 404.

The ECU 102 may also include a path controller 412. The path controller 412 may receive the current estimated values 410 along with the mediated target values 404. The path controller 412 may identify a desirable path from the current estimated values 410 to the mediated target values 404. The path controller 412 may determine and output desirable intermediate targets 414 that lay along the desirable path from the current estimated values 410 to the mediated target values 404.

The ECU 102 may also include a feedforward and feedback control 416. The feedforward and feedback control 416 may receive the desirable intermediate targets 414 along with the current estimated values 410. The feedforward and feedback control 416 may determine and output control signals 418 that may control operation of the actuators of the fuel cell circuit 118.

Referring now to FIGS. 2, 4, 5A, and 5B, a method 500 for estimating the current estimated values 410 may be performed by components of the system 101, such as by the state estimator 406. In block 502, the ECU 102 may determine or receive a control signal, such as the mediated target values 404, corresponding to desirable operation of the actuators. For example, the control signal may include or correspond to target pressure and flow values at various locations throughout the fuel cell circuit 118. As described above, the compressor 204, bypass valve 212, and restriction valve 214 may be controlled to adjust the pressure and flow values throughout the fuel cell circuit 118.

In block 504, the flow sensor 216 and the pressure sensor 218 may detect a current mass flow value of the gas flowing through the compressor 204 and a current pressure value corresponding to pressure of the gas at the outlet of the intercooler 206.

In block 506, the ECU 102 may calculate mass flow values of the gas through the components of the fuel cell circuit based on the characteristics of the components, settings of the actuators, and the mass flow detected by the flow sensor 216. Because mass flow remains relatively constant through components connected in series, it can be assumed that the mass flow through each of the intake 200, the cleaner 202, the compressor 204, and the intercooler 206, along with all pipes upstream from a flow split 226, is equal to the mass flow detected by the flow sensor 216.

In block 508, which may be a sub-block of block 506, the ECU 102 may calculate the mass flow, or other flow, values of the gas at the bypass branch 210 based on a previous bypass pressure value. The ECU 102 may calculate the flow and pressure values at each of the components of the fuel cell circuit 118 during each timestep. For example, each timestep may be 0.04 seconds, 0.08 seconds, 0.16 seconds, or the like.

Because the ECU 102 has previously calculated a pressure of the fluid through the bypass branch 210, the ECU may use a previously calculated bypass pressure value that was calculated during a previous timestep in order to calculate the current flow through the bypass branch 210. For example, the ECU may use one or more of equations 1, 2, 3, or 4 discussed below to calculate the current flow through the bypass branch using the previously calculated bypass pressure value as the pressure value. During a first iteration of the method 500, the ECU 102 may calculate the current flow value based on a previously assigned starting pressure value. In some embodiments, the ECU 102 may also or instead calculate the current flow value through the fuel cell stack 208 based on previously determined fuel cell pressure values.

In some situations, the bypass valve 212 may be closed, thus restricting airflow through the bypass branch 210. In such situations the ECU 102 may assume that the mass flow through the fuel cell stack 208 is equal to the mass flow detected by the flow sensor 216.

The ECU 102 may assume that a sum of the flow through the bypass branch 210 and through the fuel cell stack 208 is equal to the mass flow detected by the flow sensor 216. In that regard, the ECU 102 may calculate the current flow value through the fuel cell stack 208 by subtracting the flow through the bypass branch 210 from the mass flow detected by the flow sensor 216.

In block 510, the ECU 102 may calculate or receive an amount of current that is output by the fuel cell stack 208. For example, one or more sensor (not shown) may be coupled to the fuel cell stack 208 and may detect the current output level. As another example, the ECU 102 may include logic for calculating the amount of current output by the fuel cell stack 208 based on various inputs such as airflow through the fuel cell stack 208, a power request of the fuel cell stack 208, or the like.

In block 512, the ECU 102 may determine or calculate a molar fraction of the gas at the fuel cell stack 208 based on the current output by the fuel cell stack 208. The molar fraction corresponds to a ratio or fraction that indicates how much of each component is in the gas. For example, when the gas is air, the molar fraction may include a percentage of oxygen in the air, a percentage of nitrogen in the air, and the like. In some embodiments, the ECU 102 may assume that the gas flowing into the fuel cell stack 208 is standard air and includes about 21% oxygen and 79% nitrogen. The ECU 102 may then use one or more equation(s) or lookup table(s) to calculate an amount of oxygen consumed by the fuel cell stack 208, to calculate an amount of hydrogen crossing through a membrane of the fuel cell stack 208, and to calculate an amount of liquid water and/or water vapor created in a cathode of the fuel cell stack 208. For example, the amount of liquid water and/or water vapor created in the cathode may be a function of an electrical current request made of the fuel cell stack 208. Based on the results of the lookup tables/equations, the ECU 102 may calculate the molar fraction of the gas that is output by the fuel cell stack 208.

Because the fuel cell stack 208 outputs water in addition to the leftover gas, the ECU 102 may assume that the mass flow of the gas flowing into the fuel cell stack 208 is the same as the mass flow of the gas flowing out of the fuel cell stack 208 regardless of the consumption of the oxygen by the fuel cell stack 208.

The consumption of the oxygen by the fuel cell stack 208, however, may result in the gas that is output by the fuel cell stack 208 having a different viscosity than the gas that is received by the fuel cell stack 208. In that regard and in block 514, the ECU 102 may use an equation or lookup table to determine a viscosity of the gas that is output by the fuel cell stack based on the calculated molar fraction. As will be discussed below, the viscosity of the gas affects a Reynolds number, which is used to determine the pressures of the gas at locations throughout the fuel cell circuit 118.

In block 516, the ECU may determine a Reynolds number of the gas flowing through each component of the fuel cell circuit 118. For example, the ECU 102 may use an equation similar to equation 1 below to determine the Reynolds number.

$$\mathrm{Re} = \frac{\dot{m}D}{A\mu} \qquad \text{Equation 1}$$

In equation 1, Re represents the Reynolds number, $\dot{m}$ represents the mass flow that was determined in blocks 506 and 508, D represents a diameter of the component through which the gas may flow (including the actuators and pipes 220), A represents a cross-sectional area of the component through which the gas may flow, and μ represents the dynamic viscosity, which was calculated in block 514. D and A are both known values for each component and may be stored in a memory.

In block 518, the ECU 102 may calculate the laminar, turbulent, or mixed flow values of the gas through each of the components based on the Reynolds number. For example, the flow values may be provided as Darcy friction factor values. The ECU 102 may determine whether the flow through each component is a laminar flow, a turbulent flow, or a mixed flow (i.e., combination of laminar and turbulent flows) based on the Reynolds number. For example, if the Reynolds number is greater than an upper flow threshold then the flow is turbulent, meaning that the flow may be characterized by chaotic changes in pressure and flow velocity. If the Reynolds number is less than a lower flow threshold then the flow is laminar, meaning that the gas flows in parallel layers with little or no disruption between the layers. If the Reynolds number is between the lower flow threshold and the upper flow threshold then the flow exhibits characteristics of both laminar flow and turbulent flow and is considered to be a mixed flow. The upper flow threshold is a threshold value that indicates whether the flow is purely turbulent (a flow is purely turbulent when the corresponding Reynolds number is greater than the upper flow threshold). The lower flow threshold is a threshold value that indicates whether the flow is purely laminar (a flow is purely laminar when the corresponding Reynolds number is less than the lower flow threshold).

After determining whether the flow is laminar, turbulent, or mixed, the ECU 102 may calculate the flow value using equations 2 and 3 below. Equation 2 is to be used when the flow is turbulent, Equation 3 is to be used when the flow is laminar, and Equations 2 and 3 are to be used when the flow is mixed.

$$f = \frac{1}{\left[-1.8\log_{10}\left(\frac{6.9}{\mathrm{Re}} + \left(\frac{\mathrm{Roughness}}{3.7\,D}\right)^{1.11}\right)\right]^2} \qquad \text{Equation 2}$$

In equation 2, f represents a Darcy friction factor for the corresponding type of flow (i.e., turbulent). Re represents the Reynolds number that was calculated in block 516. Roughness corresponds to a roughness of the material through which the gas is flowing and is a known property of the material. D represents a diameter of the component through which the gas may flow (including the actuators and pipes 220).

$$f = \frac{64}{\mathrm{Re}} \qquad \text{Equation 3}$$

In equation 3, f represents the Darcy friction factor for the corresponding type of flow (i.e., laminar) and Re represents the Reynolds number that was calculated in block 516.

If the Reynolds number indicates that the flow is a mixed flow then the ECU 102 may calculate the value of the flow using a linear interpolation between the Darcy friction factor for the laminar flow and the Darcy friction factor for the turbulent flow (i.e., the results of equations 2 and 3). The interpolation may be based on the location of the Reynolds number between the upper flow threshold and the lower flow threshold. For example, the Darcy friction factor for the turbulent flow may be provided more weight during interpolation of the Reynolds number is nearer to the upper flow threshold than to the lower flow threshold. As another example, if the Reynolds number is directly between the upper flow threshold and the lower flow threshold, then the Darcy friction factor for the entire flow would be equal to an average of the Darcy friction factor for the laminar flow and the Darcy friction factor for the turbulent flow.

In block 520, the ECU 102 may calculate pressure values at an inlet and an outlet of each of the components, including the pipes 220, based on the laminar, turbulent, or mixed flow values. In particular, if the flow is purely laminar or purely turbulent then the ECU 102 may calculate pressure values using Equation 4 below.

$$\Delta P = \frac{\dot{m}^2(L + Le)RT_{up}f}{2DA^2 P_{up}} \qquad \text{Equation 4}$$

In Equation 4, ΔP represents a pressure drop over the component, which corresponds to a difference between pressure at the inlet of the component and at the outlet of the component. L represents a length of the component through which the gas flows. Le represents an equivalent length of the component through which the gas flows. R represents a specific gas constant of the gas, and has values of $$\frac{\mathrm{Joules}}{\mathrm{mol} \times \mathrm{Kelvin}}.$$

$T_{up}$ represents a temperature of the gas at a high pressure side of the component (i.e., a side of the component that experiences, or is currently experiencing, higher pressures than the other side). f represents the Darcy friction factor of the flow calculated in block 518. D represents a diameter of the component through which the gas may flow, and A represents a cross-sectional area of the portion of the component through which the gas may flow. $P_{up}$ represents a pressure of the gas at the high pressure side of the component.

If the flow is a mixed flow, then the ECU 102 may calculate the pressure values using Equation 5 below.

$$\Delta P = \frac{Re_{turb} - Re}{Re_{turb} - Re_{lam}}\left(\frac{\dot{m}^2(L+Le)RT_{up}}{f2D \mid A^2 P_{up}}\right) + \frac{Re - Re_{lam}}{Re_{turb} - Re_{lam}}\left(\frac{32\dot{m}\mu(L+Le)RT_{up}}{AD^2 P_{up}}\right) \qquad \text{Equation 5}$$

In Equation 5, $\Delta P$ represents a pressure drop over the component, which corresponds to a difference between pressure at the inlet of the component and at the outlet of the component. $Re_{turb}$ represents the upper flow threshold and $Re_{lam}$ represents the lower flow threshold, which were both discussed above with reference to block 518. Re represents the Reynolds number calculated in block 516. $\dot{m}$ represents the mass flow that was determined in blocks 506 and 508. L represents a length of the component through which the gas flows. Le represents an equivalent length of the component through which the gas flows. R represents a specific gas constant of the gas, and has values of $$\frac{\text{Joules}}{\text{mol} \times \text{Kelvin}}.$$

$T_{up}$ represents a temperature of the gas at a high pressure side of the component. f represents the flow value calculated in block 518. D represents a diameter of the component through which the gas may flow, and A represents a cross-sectional area of the portion of the component through which the gas may flow. $P_{up}$ represents a pressure of the gas at the high pressure side of the component.

Equations 4 and 5 above provide pressure drops but not specific pressure values at the inlets and outlets of the components. However, the ECU 102 may calculate or determine the specific pressure values based on the calculated pressure drops, the pressure detected by the pressure sensor 218, and by assuming that the pressures at an inlet 232 of the intake 200 and the outlet 234 of the valves 212, 214 is equal to ambient pressure.

For example, to find the pressure of the gas at an inlet 228 of the compressor 204 and an outlet 230 of the compressor 204, the ECU 102 may first determine the pressure drop over the intake 200, the first pipe 222, the cleaner 202, and the second pipe 224. The ECU 102 may then add or subtract the pressure drop over the intake 200 from the ambient pressure to determine the pressure at an outlet 236 of the intake 200. The ECU may continue in this fashion to determine the inlet and outlet pressures of the first pipe 222, the cleaner 202, and the second pipe 224 until the pressure at the inlet 228 of the compressor 204 is known.

The ECU 102 may then determine the pressure drop over a third pipe 238, the intercooler 206, and a fourth pipe 240. The ECU 102 may then subtract or add the pressure drop over the fourth pipe 240 from the pressure detected by the pressure sensor 218 to determine the pressure at an inlet 242 of the intercooler 206. The ECU 102 may continue in this manner until the pressure at the outlet 230 of the compressor 204 is found.

The ECU 102 may use a similar strategy to determine the absolute pressure values at the inlet and outlet of the fuel cell stack 208, the valves 212, 214, and the pipes therebetween.

In block 522, the ECU may implement a rate limiter to limit a rate of change of the calculated values. The gas within the fuel cell circuit 118 may experience dynamic compressibility, and thus delays may be experienced between components. Because the equations are used to calculate values based on an assumption that dynamic compressibility fails to affect the flow and pressure values, the calculated values may occasionally differ from the measured values. In that regard, the rate limiter may account for such delays. For example, the rate limiter may limit a rate of change of the pressure at the outlet 230 of the compressor 204 to a specific rate of change due to the fact that some delay occurs between the compressor 204 beginning to compress the air and the pressure at the outlet 230 reaching the specified value.

Referring now to FIGS. 2, 4, 6A, and 6B, a method 600 may be used to perform the functions of the path controller 412 of the ECU 102. The method 600 may be performed by various components of the system 101 such as the ECU 102, the memory 104 of FIG. 1, and the like.

In block 602, multiple maps may be stored in a memory. The maps may include a speed map, compressor flow maps, compressor pressure ratio maps, fuel cell flow rate maps, and compressor torque maps.

Figure 7:
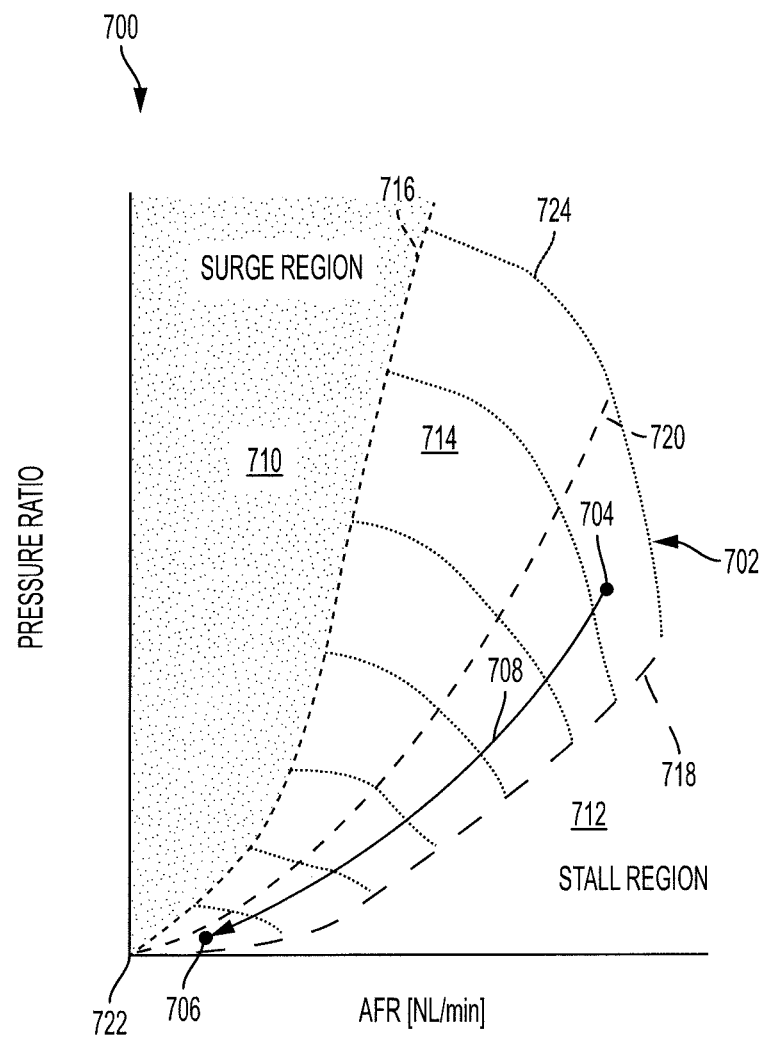
FIG. 7 is speed map that plots airflow rates and pressure ratios with corresponding compressor speeds of a compressor used in a fuel cell circuit according to an embodiment of the present invention.

With brief reference to FIG. 7, a speed map 700 is shown. The speed map 700 corresponds to the compressor of the fuel cell circuit and has an X axis that corresponds to mass flow through the compressor, a Y axis that corresponds to pressure ratio across the compressor, and multiple speed lines 702 that correspond to different speeds (such as angular velocity) of the compressor. Desirable state changes of the compressor may be plotted on the speed map 700. As shown, a starting state is shown at a starting state 704, and a final target state is shown at a final target state 706. As the compressor moves from the starting state 704 to the final target state 706, all three of pressure ratio, mass flow, and compressor speed reduced in value.

The speed map 700 further includes a surge region 710 and a stall region 712. It is undesirable for a current state of the compressor to fall within the surge region 710 or the stall region 712. In that regard, it may be desirable to control the state changes of the compressor such that any current state remains within an acceptable region 714.

The speed map 700 may include two or more paths including a surge path 716, a stall path 718, and a middle path 720. Each of the paths 716, 718, 720 extend from a 0 speed state 722 to a maximum speed line 724, and may each represent a desirable state progression of the compressor.

Returning reference briefly to FIG. 6A, one of the compressor flow, the compressor pressure ratio, the fuel cell flow rate, or the compressor torque may be referred to as a leading, or reference, state. The reference state may be selected based on importance of the state to the system or importance of the state to protection of the hardware. In some embodiments, the reference state may be compressor airflow. The remaining states may each be following states, meaning that their progression is defined based on the leading state.

Figure 8:
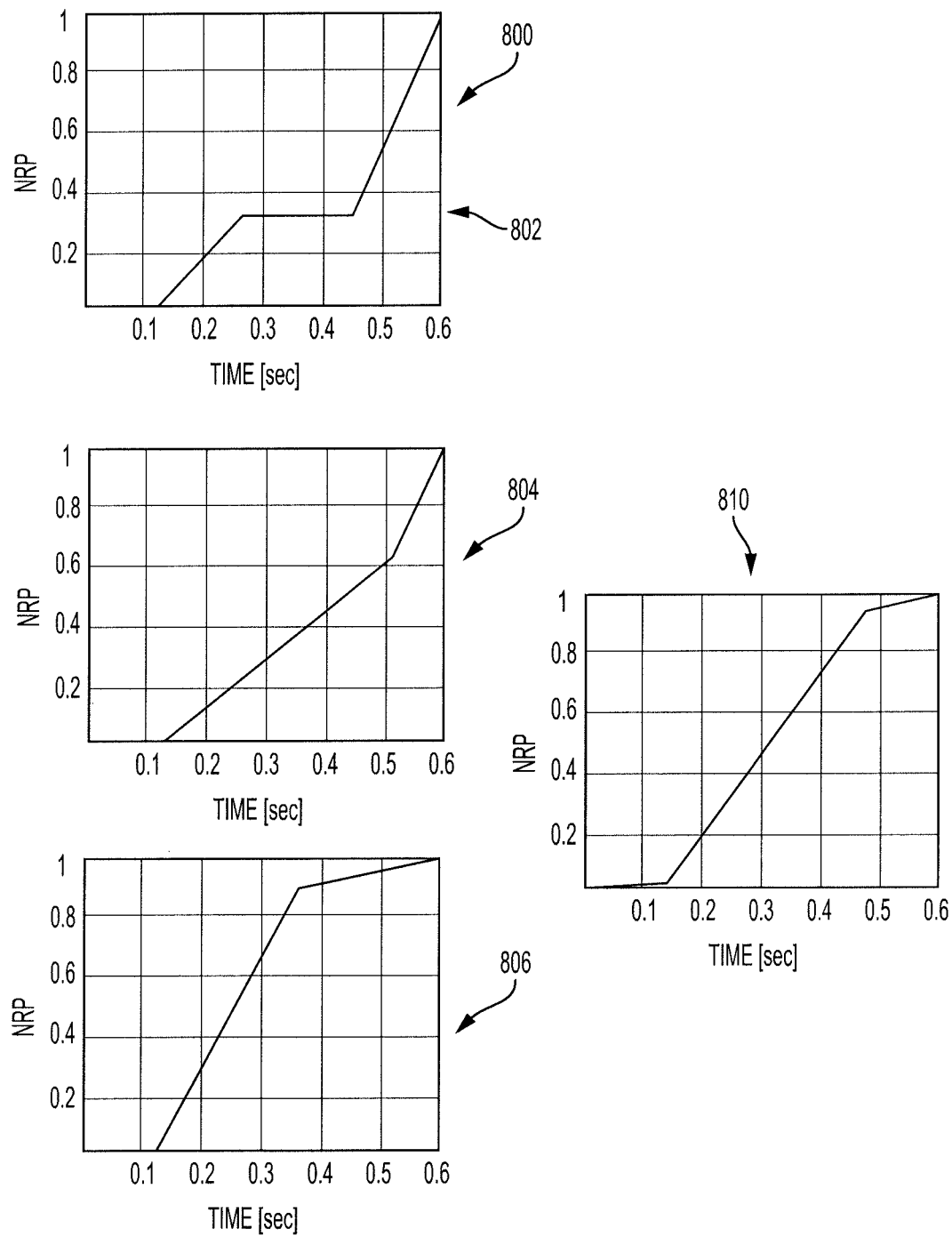
FIG. 8 illustrates stored compressor flow maps along with an interpolated compressor flow map interpolated using the stored compressor flow maps according to an embodiment of the present invention.

Referring to FIGS. 7 and 8, an exemplary set of compressor flow maps 800 is shown. The set of compressor flow maps 800 may include a surge compressor flow map 802 corresponding to the surge path 716, a middle compressor flow map 804 corresponding to the middle path 720, and a stall compressor flow map 806 corresponding to the stall path 718. Each of the compressor flow maps 800 shown in FIG. 8 may correspond to situations in which the pressure ratio, mass flow rate, and compressor speed are intended to decrease. The memory may store an additional set of compressor flow maps that correspond to situations in which the pressure ratio, mass flow rate, and compressor speed are intended to increase. In that regard, the ECU may select the set of compressor flow maps 800 when the compressor speed is intended to decrease, and may select an alternate set of compressor flow maps when the compressor speed is intended to increase.

If a starting state is located on any of the surge path 716, the middle path 720, or the stall path 718 then the ECU may select the corresponding compressor flow map. For example, if the starting state is on the middle path 720 then the ECU may select the middle compressor flow map 804 to control the compressor flow rate.

The memory may store similar sets of maps for each of the compressor pressure ratio, the fuel cell flow rate, and the compressor torque.

As shown, each of compressor flow maps 800 is normalized, having normalized Y axis values from 0 to 1 corresponding to a normalized reference progression (NRP, or normalized reference state value). In that regard, the maps 800 may provide a desirable path of the compressor airflow state from any starting state (corresponding to 0) to any final target state (corresponding to 1). Because the compressor airflow state is the leading state, the X axis of the compressor flow maps 800 corresponds to time.

Figure 9:
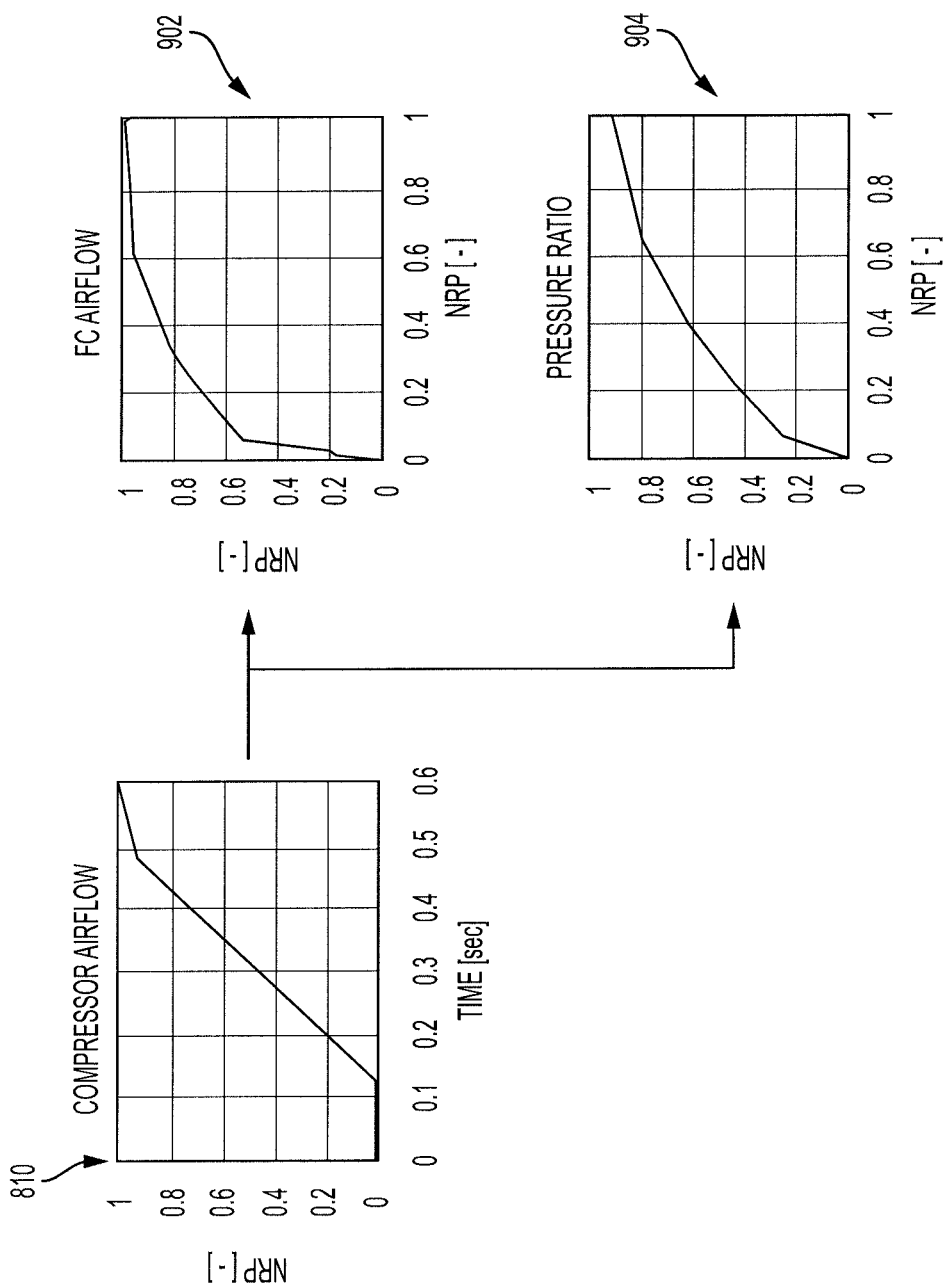
FIG. 9 illustrates the interpolated compressor flow map of FIG. 8 along with a fuel cell flow rate map and a compressor pressure ratio map that follow the progression of the compressor flow map according to an embodiment of the present invention.

Referring briefly to FIG. 9, an exemplary fuel cell flow rate map 902 is shown. The fuel cell flow rate state is a following state, meaning that it is progression is based on a completion percentage of the compressor airflow. As shown, the Y axis of the fuel cell flow rate map 902 has normalized values from 0 to 1 corresponding to a normalized follower progression (NFP, or normalized follower state value). However, because the fuel cell flow rate state is a following state, the X axis of the fuel cell flow rate map 902 corresponds to the normalized reference progression (NRP) of the compressor airflow. In that regard, progression of the fuel cell flow rate is controlled based on the normalized reference progression.

Returning reference to FIGS. 4, 6A, and 6B and in block 604, the ECU 102 may deter nine or receive final target values for each of a compressor flow rate, a compressor pressure ratio, a fuel cell flow rate, and a compressor torque. For example, the final target values may be received from the state mediator 400. The final target values may be set based on a power request of the fuel cell stack, which may correspond to driver input such as depression of an accelerator pedal, or correspond to control by the ECU 102 in autonomous or semi-autonomous vehicles.

In block 606, the ECU 102 may determine starting or current values for each of the compressor flow rate, the compressor pressure ratio, the fuel cell flow rate, and the compressor torque. For example, the ECU 102 may determine the current values based on one or more of the estimated values 410 from the state estimator 406 or from the actuator control signals 418 from the feedforward and feedback control 416.

In block 608, the ECU 102 may select a first set of maps for each of the compressor flow rate, compressor pressure ratio, fuel cell flow rate, and compressor torque if the final target values are greater than the starting or current values, and may select a second set of maps at the final target values are less than the starting or current values. For example and referring to FIGS. 7 and 8, the ECU may select the set of maps 800 because the final target state 706 is less than the starting state 704. In situations in which a final target state is greater than a starting state, the ECU may select an alternate set of compressor flow maps.

Returning reference to FIGS. 4, 6A, and 6B, the ECU 102 may interpolate a normalized compressor flow value by interpolating the current compressor flow rate between a first path and a second path on the speed map. For example and referring to FIG. 7, the ECU may determine the normalized compressor flow value by interpolating the current compressor flow rate of the starting state 704 between the stall path 718 and the middle path 720 because those are the two nearest paths to the starting state 704.

Returning reference to FIGS. 4, 6A, and 6B, the ECU 102 may create interpolated maps for the compressor flow rate, the compressor pressure ratio, the fuel cell flow rate, and the compressor torque based on the normalized compressor flow value. For example and referring to FIGS. 7 and 8, the normalized compressor flow value may indicate that 75% of the control (or interpolated) path should be based on the stall path 718 and 25% of the control path should be based on the middle path 720.

Based on this determination, the ECU 102 may create an interpolated compressor flow map 810 by interpolating between the middle compressor flow map 804 and the stall compressor flow map 806 based on the normalized compressor flow value. In that regard, the interpolated compressor flow map 810 may be created by combining the stall compressor flow map 806 with the middle compressor flow map 804 and by weighting the stall compressor flow map 806 at 75% and the middle compressor flow map 804 at 25%. The interpolated compressor flow map 810 may indicate a desirable progression of the compressor flow rate based on the specific starting state 704. The ECU 102 may similarly create interpolated maps for each of the compressor pressure ratio, the fuel cell flow rate, and the compressor torque.

Returning reference to FIGS. 4, 6A, and 6B, the ECU 102 may determine an intermediate target compressor flow rate using the interpolated compressor flow map along with Equation 6 below. The ECU may determine the intermediate target compressor flow rate further based on an amount of time that has elapsed since determining or receiving the final target compressor flow rate in block 604.

For example and referring to FIGS. 4, 6A, 6B, and 8, the ECU 102 may first identify the amount of time elapsed since determining the final target compressor flow rate, and then may locate the corresponding location on the interpolated compressor flow map 810. For example, the ECU 102 may identify that 0.2 seconds have elapsed, and thus may determine that the normalized reference progression value that corresponds to 0.2 seconds is 0.2.

The ECU 102 may then use the normalized reference progression value of 0.2 in Equation 6 below to determine the intermediate target compressor flow rate.

$$\text{Int\_tgt\_comp\_flow} = \text{start} + (\text{target} - \text{start}) * \text{NRP} \qquad \text{Equation 6:}$$

In Equation 6, Int_tgt_comp_flow represents the intermediate target compressor flow rate. start corresponds to the starting compressor flow rate determined in block 606, and target corresponds to the final target compressor flow rate determined in block 604. NRP represents the normalized reference progression value.

Returning reference to FIGS. 4, 6A, and 6B and in block 616, the ECU 102 may determine a completion percentage of the compressor flow rate from the starting compressor flow rate to the final target compressor flow rate. In some embodiments, the completion percentage may correspond to, or be the same as, the normalized reference progression value. In that regard, the completion percentage may be identified or determined within block 614 instead of or in addition to block 616.

In block 618, the ECU 102 may determine intermediate target values for the follower states based on the corresponding interpolated maps, the starting values, the target values, and the completion percentage.

Referring again to FIG. 9, the interpolated compressor flow map 810 is shown as the reference, or leading, state map. The fuel cell flow rate map 902 may likewise be an interpolated fuel cell flow rate map 902 and may be a follower state map. Furthermore, an interpolated compressor pressure ratio map 904 is also shown as a follower state map. Although a compressor acceleration is not shown, it may also be considered as a follower state and may include one or more corresponding compressor acceleration map.

As shown, the fuel cell flow rate map 902 and the compressor pressure ratio map 904 both showed normalized follower progression values (the Y axis) based on the normalized reference progression of the compressor flow (the X axis). For example, after 0.2 seconds, the normalized reference progression corresponding to the compressor flow rate (i.e., the completion percentage) may have a value of 0.2 (i.e., indicating 20% completion). In order to determine an intermediate target fuel cell flow rate, the ECU 102 may first apply the 0.2 normalized reference progression value to the fuel cell flow rate map 902, which provides a normalized follower progression (NFP) value of about 0.75.

The ECU 102 may then apply the starting fuel cell flow rate value, the final target fuel cell flow rate value, and the normalized follower progression from the fuel cell flow rate map 902 to equation 7 below.

$$\text{Int\_tgt\_fc\_flow}=\text{start}+(\text{target}-\text{start})*\text{NFP} \quad \text{Equation 7:}$$

Returning reference to FIGS. 6A and 6B and in Equation 7, Int_tgt_fc_flow represents the intermediate target fuel cell flow rate. start corresponds to the starting fuel cell flow rate determined in block 606 and target corresponds to the final target fuel cell flow rate determined in block 604. NFP represents the normalized follower progression value of the fuel cell flow rate.

In block 620, the ECU 102 may control the actuators of the fuel cell circuit (including the compressor and valves) based on the intermediate target values. For example, the ECU 102 may control at least one of the compressor, the bypass valve, or the restriction valve based on the intermediate target values for the compressor flow rate, the compressor pressure ratio, the fuel cell flow rate, and the compressor torque.

In block 622, the ECU 102 may continue to determine intermediate target values and to control the actuators to achieve the intermediate target values until the intermediate target values are the same as the final target values, or new final target values are determined or received.

In some embodiments, compressor acceleration may be an additional follower state, such that the ECU 102 may determine intermediate target values for the compressor acceleration based on interpolated maps, a starting value, a target value, and the completion percentage. The acceleration rate may be provided as a desired acceleration rate of the compressor, as a desired acceleration torque of the compressor, or both. In some embodiments, the path controller 412 of FIG. 2 may determine the desired acceleration using a method other than setting the desired acceleration as a follower state.

Figure 6A:
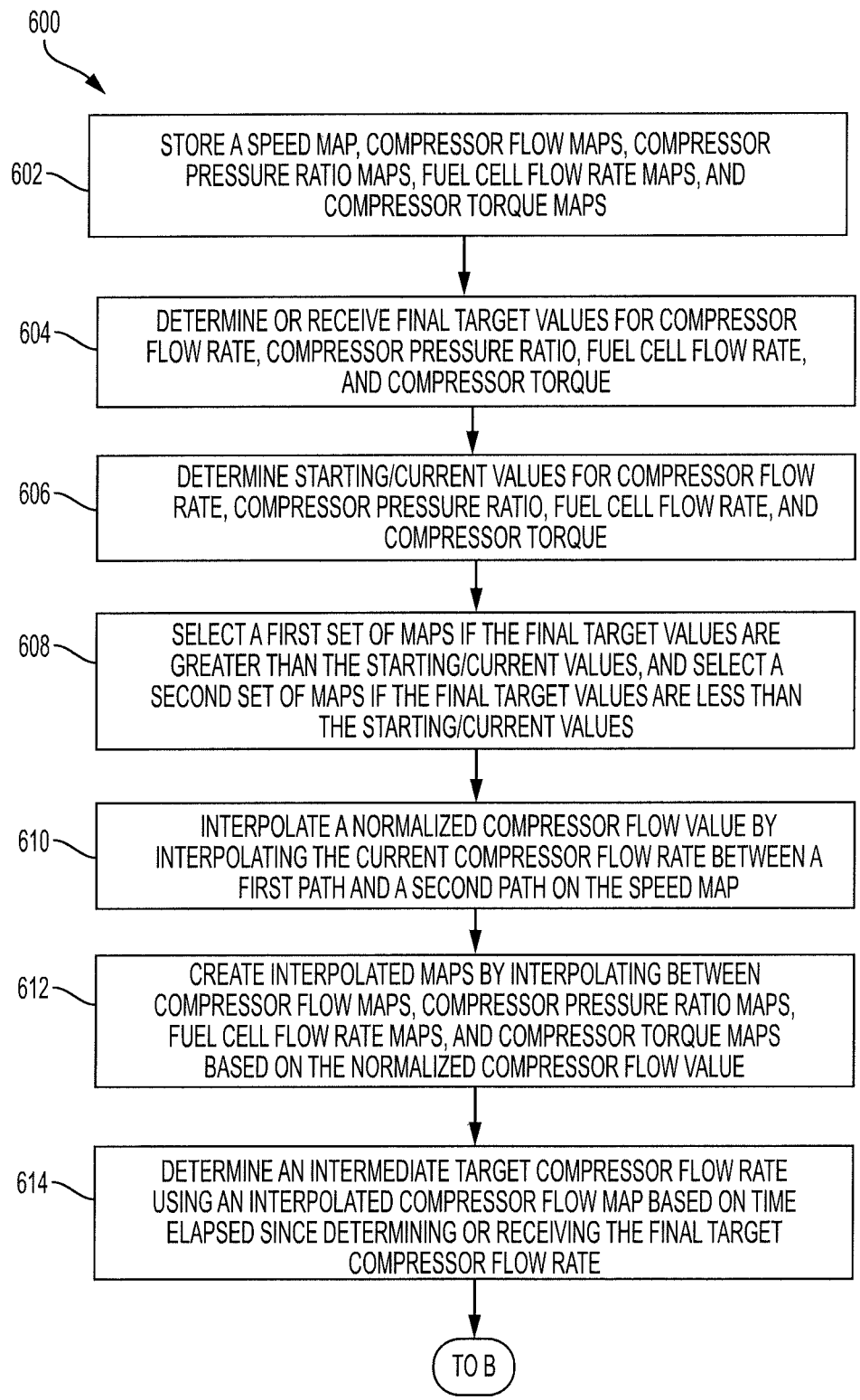
FIGS. 6A and 6B are flowcharts illustrating a method for determining a desirable progression, or path, of multiple parameters of a fuel cell circuit according to an embodiment of the present invention.
Figure 6B:
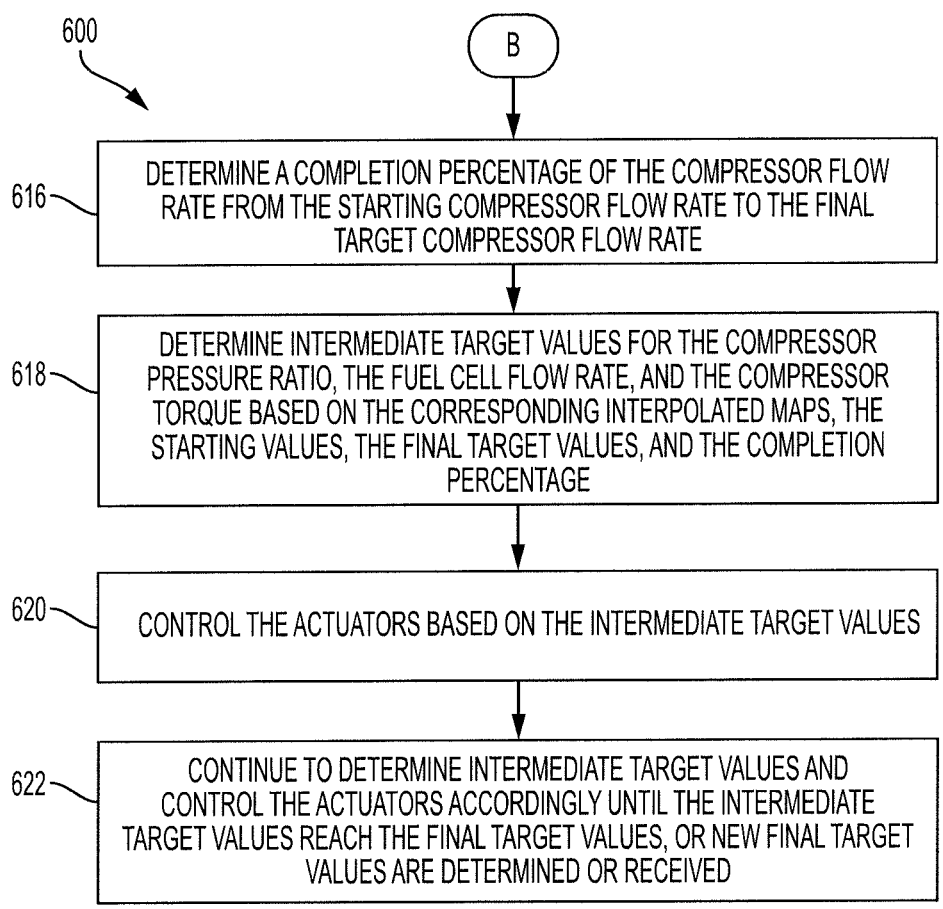
Figure 10:
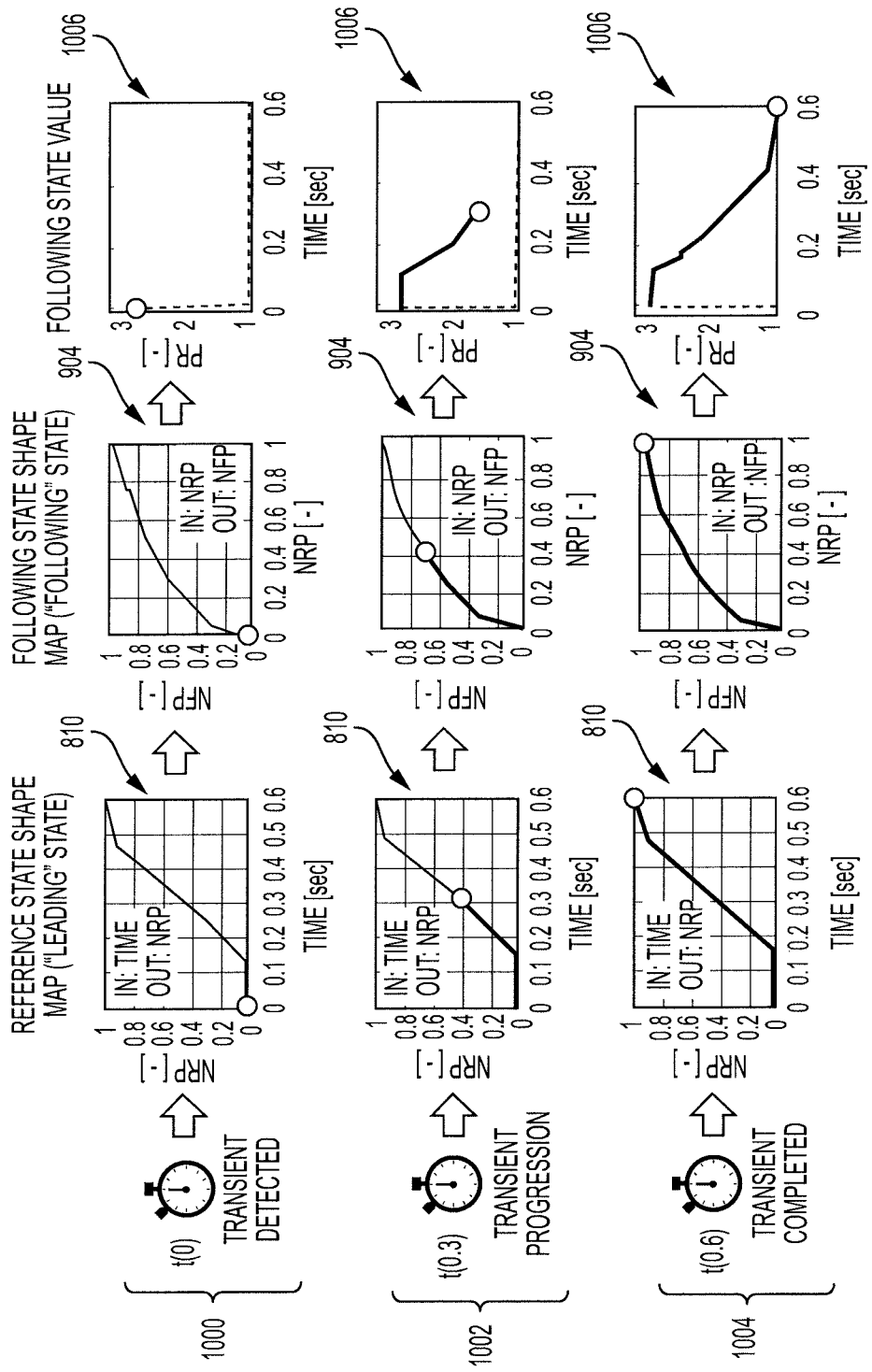
FIG. 10 includes various maps and graphs that illustrate a progression along the interpolated compressor flow map and the compressor pressure ratio map of FIG. 9 from an initial request until a target has been reached according to an embodiment of the present invention.

Referring now to FIG. 10, an exemplary usage of the method 600 of FIGS. 6A and 6B is shown. FIG. 10 illustrates the interpolated compressor flow map 810, the interpolated pressure ratio map 904, and graphs 1006 plotting the intermediate target pressure ratio values at 3 different times. A first row 1000 illustrates the status at 0 seconds, a second row 1002 illustrates the status at 0.3 seconds, and a third row 1004 illustrates the status at 0.6 seconds.

As shown in the first row 1000, the normalized reference progression on the interpolated compressor flow rate map 810 is 0 because the time is equal to 0. Accordingly, the normalized follower progression of the interpolated pressure ratio map 904 is also 0 due to the normalized reference progression being 0. Thus, plugging these values into Equation 7 yields an intermediate target value of about 2.8, which corresponds to the starting value (because the normalized follower progression value is 0, the term (target–start)*NFP is also 0, thus leaving the result of Equation 7 as start).

As shown in the second row 1002, the normalized reference progression on the interpolated compressor flow map 810 is about 0.4, which is determined by applying 0.3 seconds to the interpolated compressor flow rate map 810. Accordingly, the normalized follower progression of the interpolated pressure ratio map 904 is equal to about 0.65, which corresponds to the normalized reference progression value of 0.4. Thus, plugging these values into Equation 7 yields an intermediate pressure ratio target value of about 1.3.

As shown in the third row 1004, the normalized reference progression on the interpolated compressor flow rate map 810 is 1, which is determined by applying 0.6 seconds to the interpolated compressor flow rate map 810. Accordingly, the normalized follower progression of the interpolated pressure ratio map 904 is equal to 1, which corresponds to the normalized reference progression value of 1. Thus, plugging these values into Equation 7 yields an intermediate pressure ratio target value of 1. Accordingly, the method 600 of FIGS. 6A and 6B may terminate or restart due to the intermediate pressure ratio target value being equal to the final target pressure ratio value.

Figure 11:
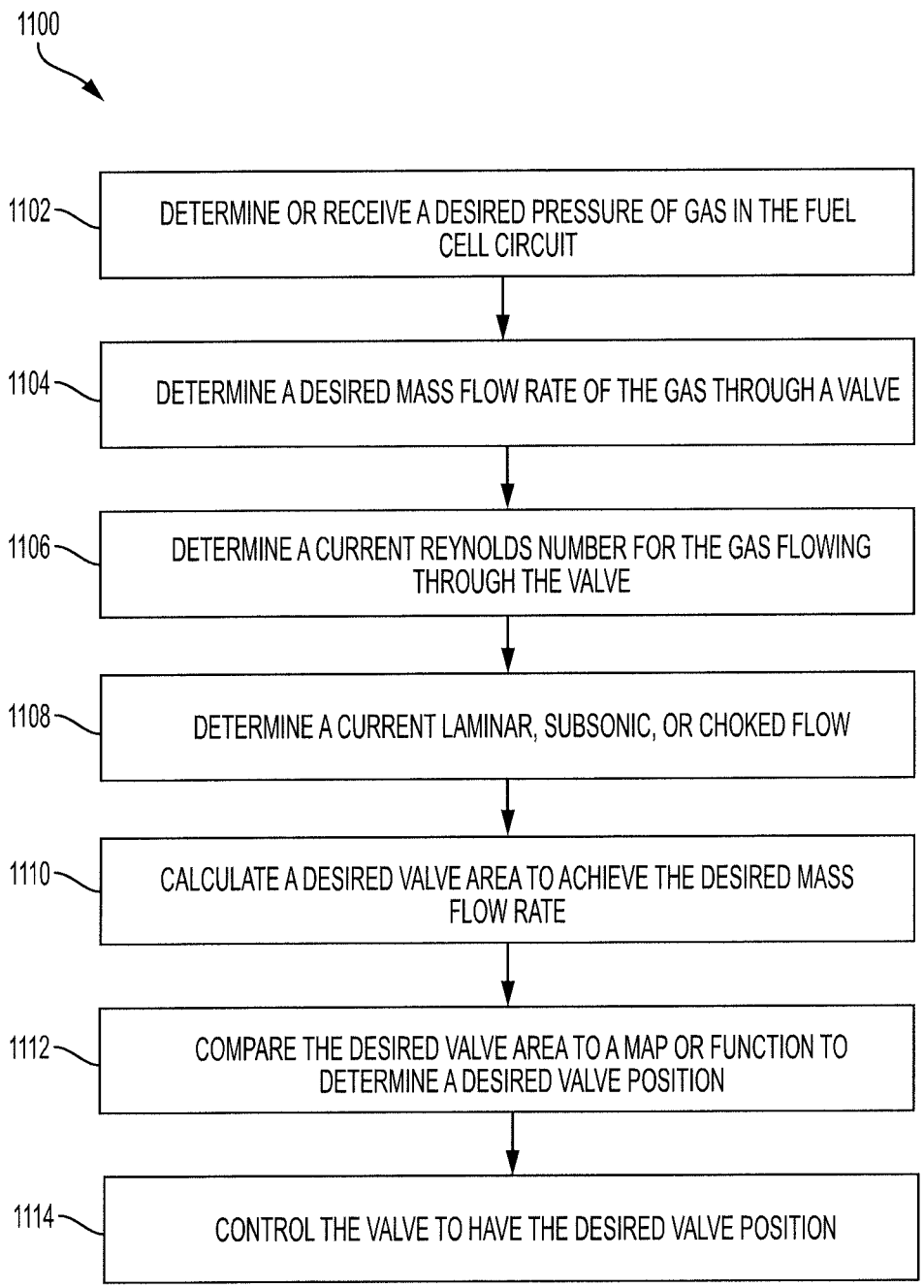
FIG. 11 is a flowchart illustrating a method for a feedforward control of a valve of a fuel cell circuit according to an embodiment of the present invention.

Referring now to FIGS. 2, 4, and 11, a method 1100 may be performed by the ECU 102, such as by the feedforward and feedback control 416, to perform a feedforward control of either of the restriction valve 214 or the bypass valve 212. In that regard, a first instance of the method 1100 may be used to perform feedforward control of the restriction valve 214, and a second instance of the method 1100 may be used to perform feedforward control of the bypass valve 212.

In block 1102, the ECU 102 may determine or receive a desired pressure of the gas within the fuel cell circuit. For example, the desired pressure may correspond to a desired pressure at an inlet 244 or an outlet 246 of the fuel cell stack 208, at the inlet 228 or the outlet 230 of the compressor 204, or the like. For example, the desired pressure may be determined by the state mediator 400 and may be based on the control signal 402.

In block 1104, the ECU 102 may determine a desired mass flow rate of the gas through a corresponding valve (either the restriction valve 214 or the bypass valve 212) based on the desired pressure of the gas that was determined or received in block 1102. For example, the desired pressure may correspond to a desired pressure at the outlet 246 of the fuel cell stack 208. In that regard, the ECU 102 may calculate a desired mass flow of the gas through the restriction valve 214 that will cause the pressure at the outlet 246 of the fuel cell stack 208 to reach the desired pressure. For example, the ECU 102 may determine the desired mass flow rate using an equation similar to Equation 4 above.

In some embodiments, the path controller 412 may determine the desired mass flow rate of the gas through the valve. The desired mass flow rate may correspond to an intermediate target mass flow rate as determined by the path controller 412. For example, the path controller 412 may dictate or provide desired pressure values and desired mass flow values of the gas through the components of the fuel cell circuit 118 (such as the bypass valve 212 and the restriction valve 214).

In some embodiments, the state estimator 406 may then calculate or determine the pressure and flow values at each component of the fuel cell circuit 118 that are currently unknown, and calculate or determine the pressure and flow values at each component if the system achieves the target state. For example, the state estimator 406 may calculate or determine the pressure and flow values at each component if the corresponding valve is set to the desired mass flow rate.

In block 1106, the ECU 102 may determine a current Reynolds number corresponding to the gas flowing through the valve. For example, the ECU 102 may determine the current Reynolds number using an equation similar to Equation 1 above.

In block 1108, the ECU 102 may determine a current laminar, subsonic, or choked flow. For example, the ECU 102 may determine the current laminar, subsonic, or choked flow based on the Reynolds number. Initially, the ECU 102 may determine whether the flow through the valve is laminar, subsonic, or choked. If the Reynolds number is within a first range of values then the ECU 102 may determine that the flow is laminar. If the Reynolds number is within a second range of values then the ECU 102 may determine that the flow is subsonic. If the Reynolds number is within a third range of values then the ECU 102 may determine that the flow is choked.

After determining whether the flow is laminar, subsonic, or choked, the ECU 102 may determine the specific flow value using one or more of Equations 8 through 10 below.

$$\Psi = \sqrt{\frac{2\gamma}{(\gamma-1)} * \left(B_{lam}^{\frac{2}{\gamma}} - B_{lam}^{\frac{(\gamma-1)}{\gamma}}\right) \frac{\left(1 - \frac{P_d}{P_u}\right)}{(1 - B_{lam})}} \quad \text{Equation 8}$$

Equation 8 is to be used when the flow is a laminar flow. In equation 8, ψ represents the laminar flow value. γ represents a specific heat ratio of the gas flowing through the valve, and corresponds to a ratio of specific heat of the gas at constant volume to specific heat of the gas at constant pressure. $B_{lam}$ represents a pressure ratio above which the flow is assumed to be laminar. $P_d$ represents a pressure of the gas at a low pressure side of the corresponding valve, and $P_u$ represents a pressure of the gas at a high pressure side of the corresponding valve.

$$\Psi = \sqrt{\frac{2\gamma}{(\gamma-1)}\left(\frac{P_d^{\frac{2}{\gamma}}}{P_u} - \frac{P_d^{\frac{(\gamma-1)}{\gamma}}}{P_u}\right)} \quad \text{Equation 9}$$

Equation 9 is to be used when the flow is a subsonic flow. The variables used in Equation 9 have the same meaning as the corresponding variables in Equation 8, except that ψ represents the subsonic flow value.

$$\Psi = \sqrt{\gamma * B_{cr}^{\frac{(\gamma-1)}{\gamma}}} \quad \text{Equation 10}$$

Equation 10 is to be used when the flow is a choked flow. The variables used in Equation 10 have the same meanings as the corresponding variables in Equation 8, except that ψ represents the choked flow value. The newly introduced variable, $B_{cr}$, represents a critical pressure ratio and may be calculated using equation 11 below.

$$B_{cr} = \frac{2}{(\gamma+1)}^{\frac{\gamma}{(\gamma-1)}} \quad \text{Equation 11}$$

In Equation 11, γ has the same meaning described above with reference to Equation 8.

After determining the current laminar, subsonic, or choked flow, the ECU 102 may calculate a desired valve area to achieve the desired mass flow rate in block 1110. The desired valve area corresponds to a cross-sectional area of the valve through which the gas may flow. The cross-sectional area may be changed by adjusting the valve position. The ECU 102 may solve Equation 12 below for the desired valve area.

$$\dot{m} = Cd \frac{A}{\sqrt{R_s * T_u}} P_u \Psi \quad \text{Equation 12}$$

In equation 12, ṁ is the desired mass flow rate. Cd is a discharge coefficient. A is the desired valve area for which the ECU 102 may solve. $R_s$ is a specific gas constant. $T_u$ is a temperature at the high pressure side of the valve and $P_u$ is a pressure at the high pressure side of the valve. Ψ is the current laminar, subsonic, or choked flow that was calculated in block 1108.

The memory 104 of FIG. 1 may store a map or function that associates desired valve areas with corresponding valve positions. In that regard and in block 1112, the ECU 102 may compare the desired valve area that was calculated in block 1110 to the map or function to determine a desired valve position that corresponds to the desired valve area. Stated differently, causing the valve to have the desired valve position in turn causes the valve to have the desired valve area and, thus, achieve the desired mass flow through the valve.

In some embodiments, the function may include an equation such that the ECU 102 may solve the equation using the desired valve area to determine the desired valve position. For example, the ECU 102 may use an equation similar to Equation 13 below to solve for the desired valve position or to populate a map that associates desired valve areas with desired valve positions.

$$A = \left(\frac{\pi D}{2}\right)^2 c + A_0 \quad \text{Equation 13}$$

Figure 12:
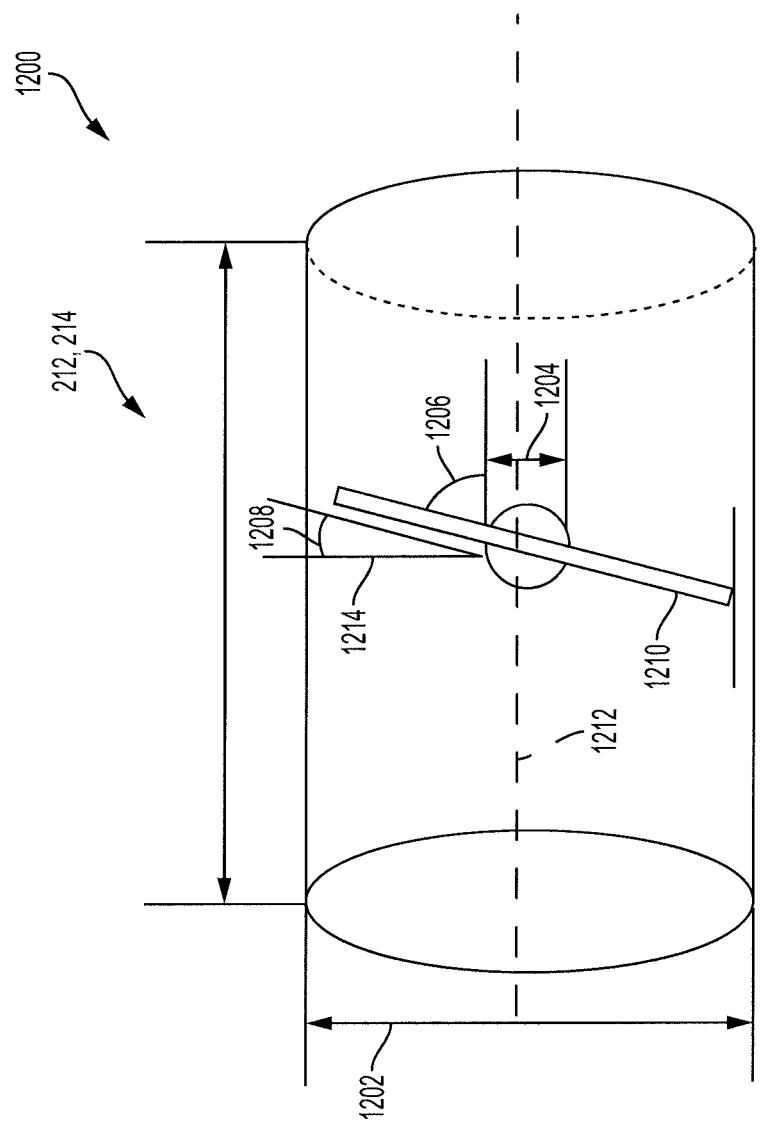
FIG. 12 illustrates an exemplary valve for use in a fuel cell circuit according to an embodiment of the present invention.

In Equation 13, A is the desired valve area. Referring briefly to FIG. 12, an exemplary valve 1200, which may similar to the same as the bypass valve 212 or the restriction valve 214, is shown to illustrate the various parameters of the equations. In Equation 13, D is a diameter 1202 of the valve 1200. $A_0$ is a throttle leak area. c is an independent variable and is shown in Equation 14 below.

$$c = 1 - b + \frac{2}{\pi}\left[a\sqrt{1-\left(\frac{a}{b}\right)^2} - b\operatorname{asin}\left(\frac{a}{b}\right) - a\sqrt{1-(a)^2} + \operatorname{asin}(a)\right] \quad \text{Equation 14}$$

In Equation 14, a is provided in Equation 15 below, and b is provided in Equation 16 below.

$$a = \frac{t}{D} \quad \text{Equation 15}$$

In Equation 15, t is a throttle shaft diameter illustrated as a throttle shaft diameter 1204 of the valve 1200. D again represents the diameter 1202.

$$b = \frac{\cos(\alpha)}{\cos(\alpha_0)} \quad \text{Equation 16}$$

In Equation 16, α is an angle 1208 between a valve plate 1210 and a longitudinal axis 1212 and corresponds to a throttle angle of the valve 1200. $\alpha_0$ is an angle 1206 between the valve plate 1210 and a line 1214 perpendicular to the axis 1212, and corresponds to a closed throttle angle. α and $\alpha_0$ may both be measured in radians.

Returning reference to FIGS. 2, 4, and 11, the ECU 102 may solve Equations 13-16 to determine the desired valve position. For example, the ECU 102 may first solve Equation 13 for A, the desired valve area. Based on the value of A, the ECU 102 may then solve Equation 14 to identify the value of b, and may then solve Equation 16 for α.

After the ECU 102 determines the desired valve position, the ECU may control the valve in block 1114 to have the desired valve position. In that regard, after the ECU controls the valve to have the desired valve position, the mass flow through the valve may be near the desired mass flow value determined in block 1104. The ECU 102 may perform the method 1100 once for the bypass valve 212 and may perform the method 1100 again for the restriction valve 214. In some embodiments, the ECU 102 may perform two instances of the method 1100 simultaneously (i.e., may perform a first instance of the method 1100 for the bypass valve 212 and simultaneously perform a second instance of the method 1100 for the restriction valve 214).

Referring now to FIGS. 2, 4, 13A, and 13B, a method 1300 may be used by the ECU 102, such as in the feedforward or feedback control 416, to perform a feedforward control of the compressor 204. The control of the compressor 204 may include both a speed control and a torque control. Although the method 1300 illustrates the speed control and the torque control occurring one after the other, one skilled in the art will realize that the speed control and the torque control may be performed simultaneously or may be performed one after the other.

In block 1302, a speed map, such as the speed map the 700 of FIG. 7, may be stored in the memory. The speed map may associate desired compressor flow rates and desired compressor pressure ratios with corresponding desired, or target, compressor speeds.

In block 1304, the ECU 102 may determine or receive a desired compressor flow rate and a desired compressor pressure ratio corresponding to a pressure ratio across the compressor 204. For example, the desired compressor flow rate and the desired compressor pressure ratio may be received from the path controller 412.

In block 1306, the ECU 102 may compare the desired flow rate and the desired pressure ratio to the speed map to determine a desired compressor speed. In some embodiments, the ECU 102 may calculate the desired compressor speed based on the desired flow rate and the desired pressure ratio.

After calculating the desired compressor speed, the ECU 102 may control the compressor 204 to achieve the desired compressor speed in block 1308.

In block 1310, the ECU 102 may determine or receive a current desired compressor speed corresponding to a desired compressor speed at a current timestep. For example, the current desired compressor speed may be received from the path controller 412.

In block 1312, the ECU 102 may determine or receive a future desired compressor speed corresponding to a future timestep. In some embodiments, the future timestep may be a timestep immediately after the current timestep and, in some embodiments, the future timestep may be multiple timesteps beyond the current timestep. The future desired compressor speed may likewise be received from the path controller 412.

In block 1314, the ECU 102 may calculate a speed difference between the current desired compressor speed and the future desired compressor speed.

Figure 13A:
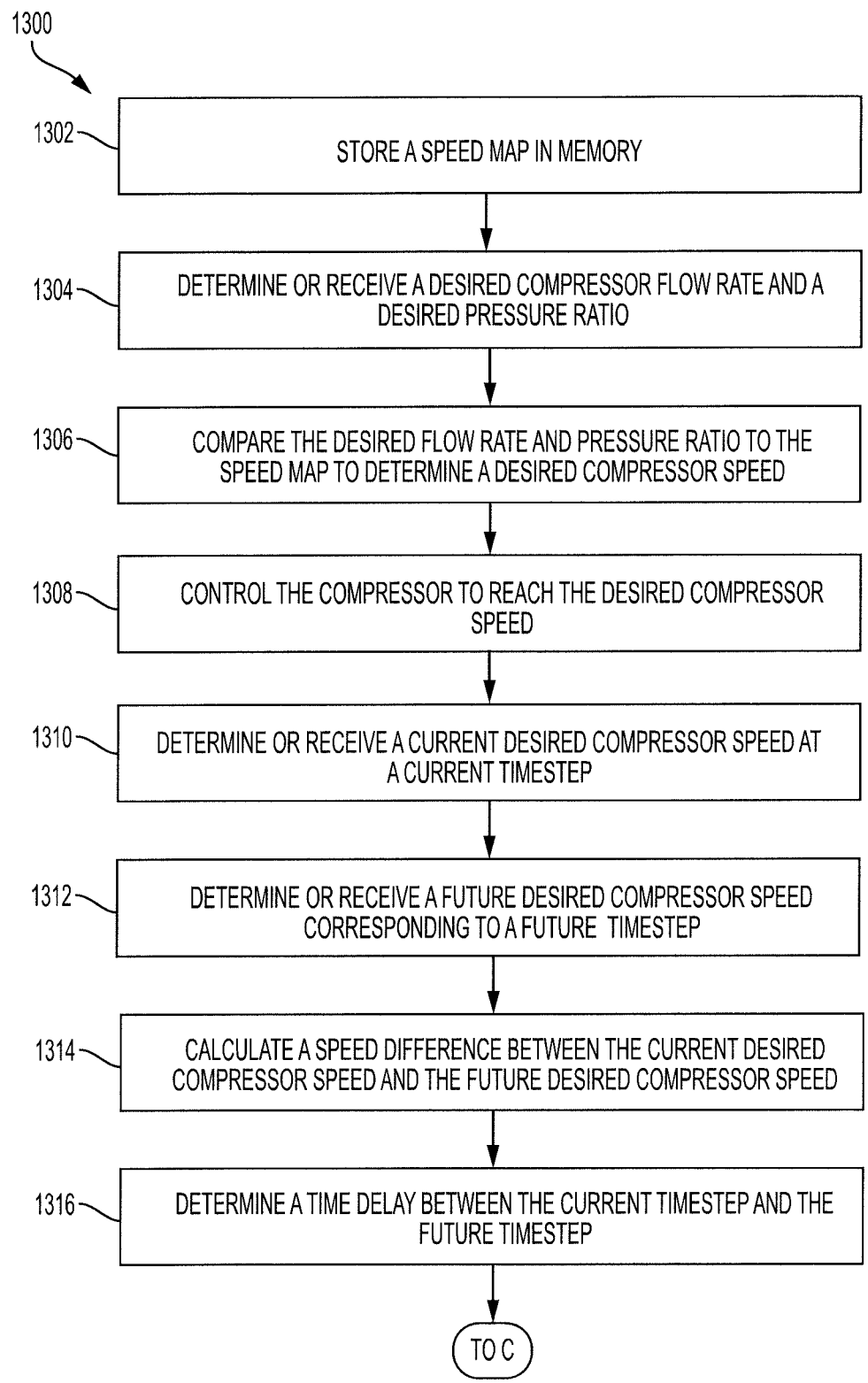
FIGS. 13A and 13B are flowcharts illustrating a method for feedforward control of a compressor of a fuel cell circuit according to an embodiment of the present invention.
Figure 13B:
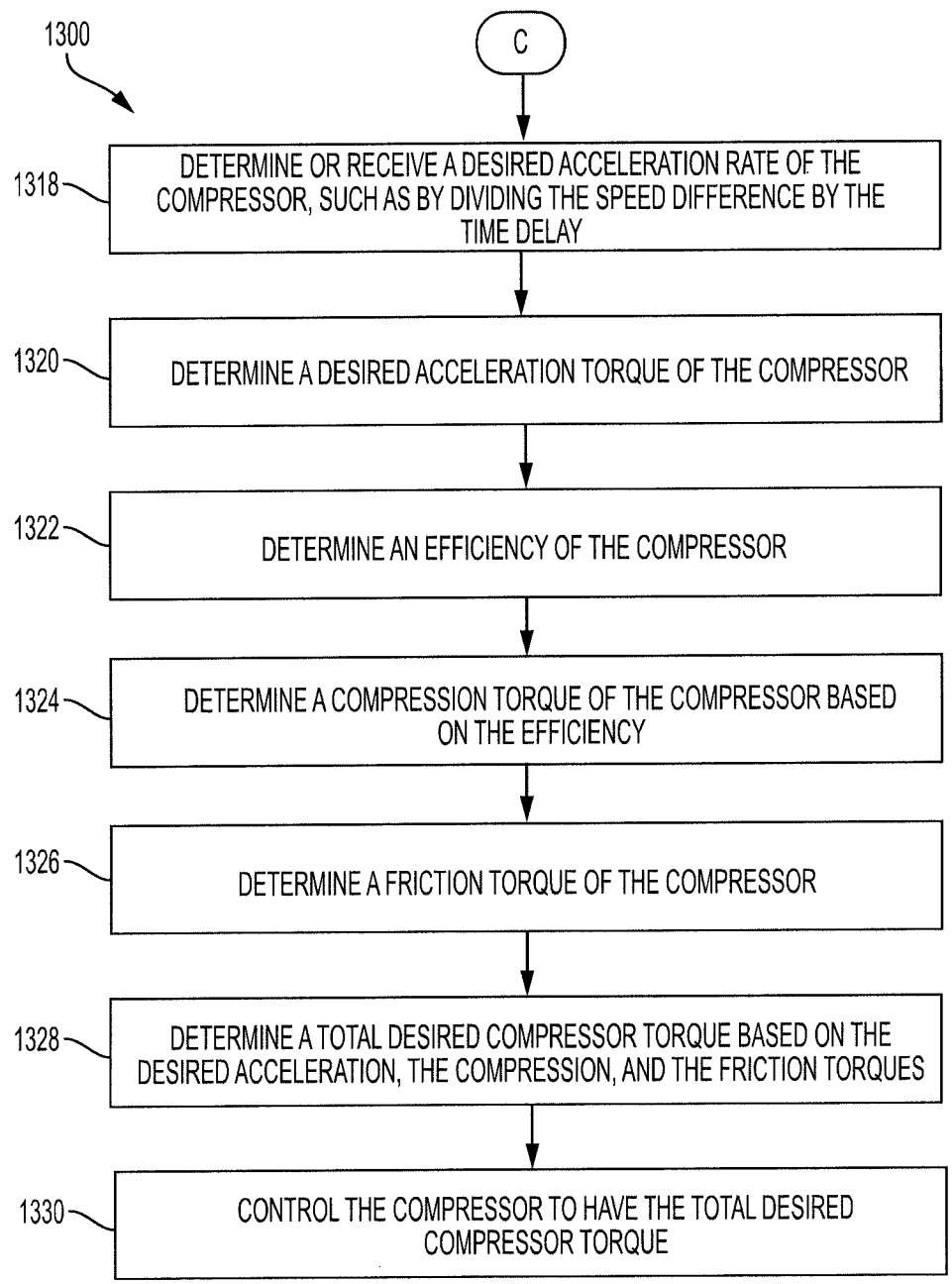
Figure 14:
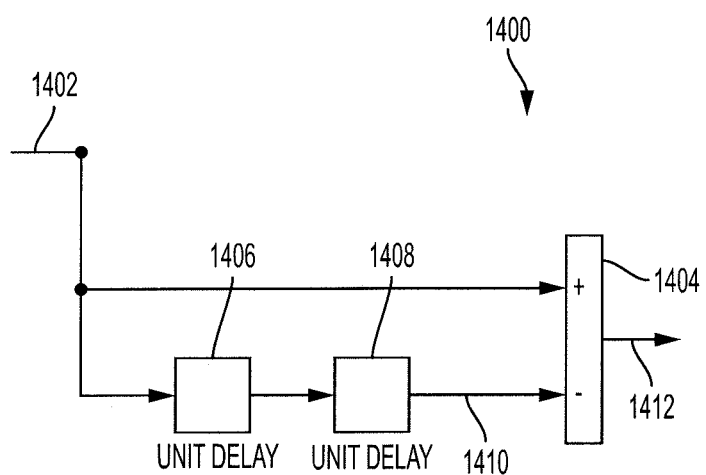
FIG. 14 is a block diagram illustrating a control circuit for implementing the method of FIGS. 13A and 13B according to an embodiment of the present invention.

For example and with brief reference to FIGS. 13A, 13B, and 14, a control system 1400 may be used to perform the operations of block 1310 through block 1314. In particular, a desired compressor speed 1402 may be received. The desired compressor speed 1402 may be received by a comparator 1404. The desired compressor speed 1402 may likewise be received by a first unit delay block 1406 and a second unit delay block 1408. Each of the first unit delay block 1406 and the second unit delay block 1408 may delay the received desired compressor speed 1402 by one or more timestep. In that regard, the output of the second unit delay block 1408 may be referred to as a previous desired compressor speed 1410 and the desired compressor speed 1402 may be referred to as a current desired compressor speed 1402 as it corresponds to a later point in time than the previous desired compressor speed 1410. In some embodiments, the output of the second unit delay block 1408 may be referred to as a current desired compressor speed, and the desired compressor speed 1402 may be referred to as a future desired compressor speed, due to the fact that the desired compressor speed 1402 corresponds to a desired speed that is in the future relative to the speed output by the second unit delay block 1408.

The comparator 1404 may compare the previous (or current) desired compressor speed 1410 and the current (or future) desired compressor speed 1402 and output a speed difference 1412 corresponding to a difference between the two.

Returning reference to FIGS. 2, 4, 13A, and 13B, and in block 1316, the ECU 102 may determine a time delay between the current timestep and the future timestep, corresponding to an amount of time between the two.

In block 1318, the ECU 102 may determine or receive a desired acceleration rate of the compressor. The desired acceleration rate may correspond to the speed difference determined in block 1314 along with the time delay determined in block 1316. In particular, the ECU 102 may divide the speed difference by the time delay. The result of this division provides units of acceleration that correspond to the desired acceleration rate.

In some embodiments and as described above, the path controller 412 may provide intermediate target compressor acceleration values, which may be used as the desired acceleration rate. In that regard, blocks 1310 through 1318 may be replaced with a block that receives the desired acceleration rate from the path controller 412. In some embodiments, the path controller 412 may provide the desired acceleration torque of the compressor instead of, or in addition to, the desired acceleration rate.

In block 1320, the ECU may determine a desired acceleration torque of the compressor based on the desired acceleration rate that was determined in block 1318. In particular, the ECU 102 may use an equation similar to Equation 17 below to determine the desired acceleration torque of the compressor 204.

$$\tau_{acceleration} = I\alpha \qquad \text{Equation 17:}$$

In Equation 17, $\tau_{acceleration}$ is the desired acceleration torque of the compressor 204. I is an equivalent inertia, and may have units such as kg*m². The equivalent inertia may correspond to inertia of the components of the compressor 204 such as the gearbox, the shaft, the airfoil, and the like. $\alpha$ is the angular acceleration, which may be determined based on the desired acceleration rate of the compressor 204.

In block 1322, the ECU 102 may determine an efficiency of the compressor 204. For example, a memory may store an efficiency map that associates compressor flow values and compressor pressure ratio values to corresponding efficiencies. In that regard, the ECU 102 may determine the efficiency of the compressor 204 by applying a current compressor flow value and a current compressor pressure ratio to the efficiency map to retrieve the current efficiency.

In block 1324, the ECU 102 may determine a compression torque of the compressor 204 based on the efficiency that was determined in block 1322. For example, the ECU 102 may use an equation similar to Equation 18 below to calculate the compression torque.

$$\tau_{compression} = \dot{m} C_P T_{in} \left( \left( \frac{P_{out}}{P_{in}} \right)^{\frac{\gamma-1}{\gamma}} - 1 \right) \frac{\left( \frac{1}{Eff} \right)}{\omega} \qquad \text{Equation 18}$$

In equation 18, $\tau_{compression}$ is the compression torque of the compressor 204. $\dot{m}$ is a desired mass flow of the gas through the compressor 204, and may be received from the path controller 412. $C_p$ is a specific heat of the gas within the compressor 204. $T_{in}$ is the temperature of the gas at the inlet 228 of the compressor 204. $P_{out}$ is a target pressure of the gas at the outlet 230 of the compressor 204, and $P_{in}$ is a target pressure of the gas at the inlet 228 of the compressor 204. $P_{out}$ and $P_{in}$ may be received from the path controller 412. $\gamma$ represents a specific heat ratio of the gas flowing through the valve, and corresponds to a ratio of specific heat of the gas at constant pressure to specific heat of the gas at constant volume. Eff is the efficiency that was determined in block 1322. $\omega$ is the compressor speed, which may be measured in radians per second. The ECU 102 may calculate $\omega$ using Equation 19 below.

In some embodiments, a map may be created for compression torque by performing calculations with changing variable values and storing the results in the map. In that regard, the ECU 102 may receive at least one of a compressor speed or a compressor ratio, may compare the speed and pressure ratio to the map, and may determine the compression torque based on the comparison to the map.

$$\omega = ACP_{spd} 2 \frac{\pi}{60} g_{ratio} \qquad \text{Equation 19}$$

In Equation 19, $\omega$ is the compressor speed. $ACP_{spd}$ is the motor speed of the motor of the compressor 204 (such as the motor 306 of the compressor 300 of FIG. 3). $g_{ratio}$ is a current gear ratio of the gearbox of the compressor (such as the gearbox 308 of the compressor 300 of FIG. 3).

In block 1326, the ECU 102 may determine a friction torque of the compressor 204. For example, the ECU may use an equation similar to Equation 20 below to calculate the friction torque.

$$\tau_{friction} = \text{visc}_{coef} \omega + \text{Col}_{trq} + (\text{brkwy}_{trq} - \text{Col}_{trq}) e^{(-trans_{coef} \omega)} \qquad \text{Equation 20:}$$

In Equation 20, $\tau_{friction}$ is the friction torque. $\text{visc}_{coef}$, $\text{Col}_{trq}$, $\text{brkwy}_{trq}$, and $\text{trans}_{coef}$ are tuned constant values. $\omega$ is the compressor speed that was calculated in Equation 19 above.

In some embodiments, a map may be created for friction torque by performing calculations with changing variable values and storing the results in the map. In that regard, the ECU 102 may receive at least one of a compressor speed or a compressor pressure ratio, may compare the speed and pressure ratio to the map, and may determine the friction torque based on the comparison to the map.

In some embodiments, a map may be created for combined friction and compression torque values by performing calculations with changing variable values and storing the results in the map. In that regard, the ECU 102 may receive a compressor speed and a compressor pressure ratio, may compare the speed and pressure ratio to the map, and may determine the combined friction and compression torque value based on the comparison to the map.

In block 1328, the ECU 102 may determine a total desired compressor torque based on the desired acceleration torque, the compression torque, and the friction torque. For example, the ECU 102 may determine the total desired compressor torque by adding each of the desired acceleration torque, the compression torque, and the friction torque together.

In block 1330, the ECU 102 may control the compressor to have the total desired compressor torque that was determined in block 1328.

Referring now to FIGS. 2, 4, 15A, and 15B, a method 1500 may be used by the ECU 102, such as in the feedforward or feedback control 416, to perform a feedback control of the bypass valve 212 and the restriction valve 214. In particular, the ECU 102 may compare the current and target values and identify a feedback control based on a difference between the current and target values. For example, the values may include a pressure at an outlet 246 of the fuel cell stack 248 for controlling the restriction valve 214, and a pressure ratio across the bypass valve 212 for controlling the bypass valve 212.

Figure 16A:
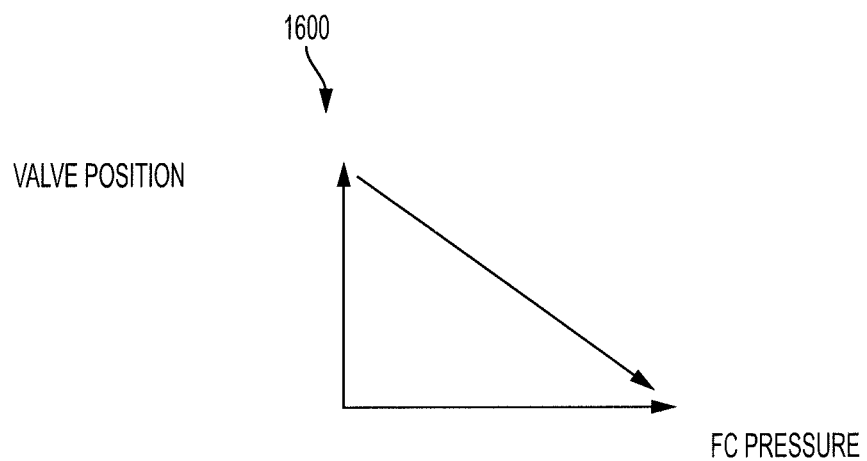
FIGS. 16A and 16B illustrate pressure maps used in the method of FIGS. 15A and 15B according to an embodiment of the present invention.
Figure 16B:
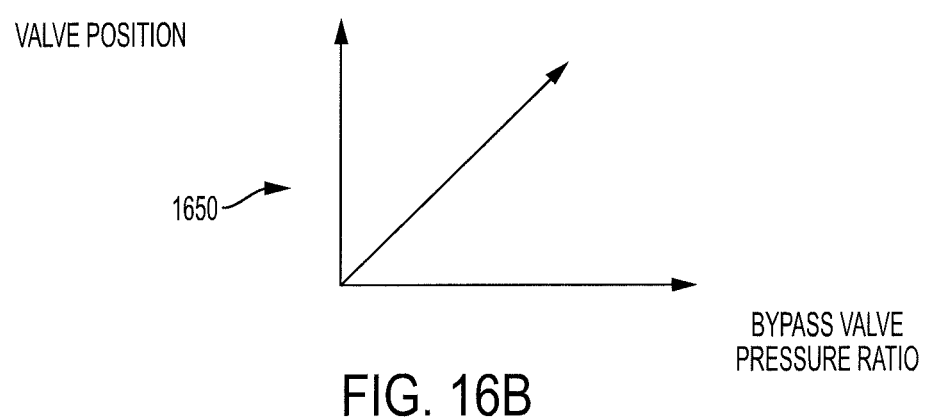

In particular and in block 1502, the ECU 102 may store a pressure map that associates pressure values with corresponding valve positions. For example and referring to FIGS. 2, 16A and 16B, a first pressure map 1600 associates pressure at the outlet 246 of the fuel cell stack 208 (along the X axis) with a valve position of the restriction valve 214

(along the Y axis). In that regard, a valve position corresponding to a valve position of the restriction valve 214 may be retrieved from the first pressure map 1600 based on a received pressure value.

Likewise, a second pressure map 1650 associates pressure ratio across the bypass valve 212 (along the X axis) with a valve position of the bypass valve 212 (along the Y axis). In that regard, a valve position corresponding to a valve position of the bypass valve 212 may be received from the second pressure map 1650 based on a received pressure ratio.

Returning reference to FIGS. 2, 4, 15A, and 15B and in block 1504, the ECU 102 may determine or receive a desired pressure value of the gas in the fuel cell circuit. The desired pressure value may correspond to a pressure at the outlet 246 of the fuel cell stack 208 or a pressure ratio across the bypass valve 212.

In block 1506, the ECU 102 may determine or receive a current pressure value of the gas in the fuel cell circuit. Again, the current pressure value may correspond to a pressure at the outlet 246 of the fuel cell stack 208 or a pressure ratio across the bypass valve 212.

In block 1508, the ECU 102 may apply the desired pressure value to the pressure map to determine a desired valve position. For example, the ECU 102 may apply the desired pressure at the outlet 246 of the fuel cell stack 208 to the first pressure map 1600 to determine a desired valve position of the restriction valve 214. Likewise, the ECU 102 may apply the desired pressure ratio across the bypass valve 212 to the second pressure map 1650 to determine a desired valve position of the bypass valve 212.

In block 1510, the ECU 102 may apply the current pressure value to the pressure map to determine a current valve position. This may be done for each of the restriction valve 214 and the bypass valve 212.

In block 1512, the ECU 102 may compare the current pressure value to the target pressure value to identify a different signal corresponding to a difference between the current pressure value and the target pressure value. The ECU 102 may perform this operation for each of the restriction valve 214 and the bypass valve 212.

In block 1514, the ECU 102 may apply a proportional-integral-derivative (PID, or PI) controller to the different signal to determine a desired adjustment to the valve position. The PID controller may analyze past and present values of the error signal and generate the feedback control signal based on present error values, past error values, and potential future errors of the error signal.

Figure 15A:
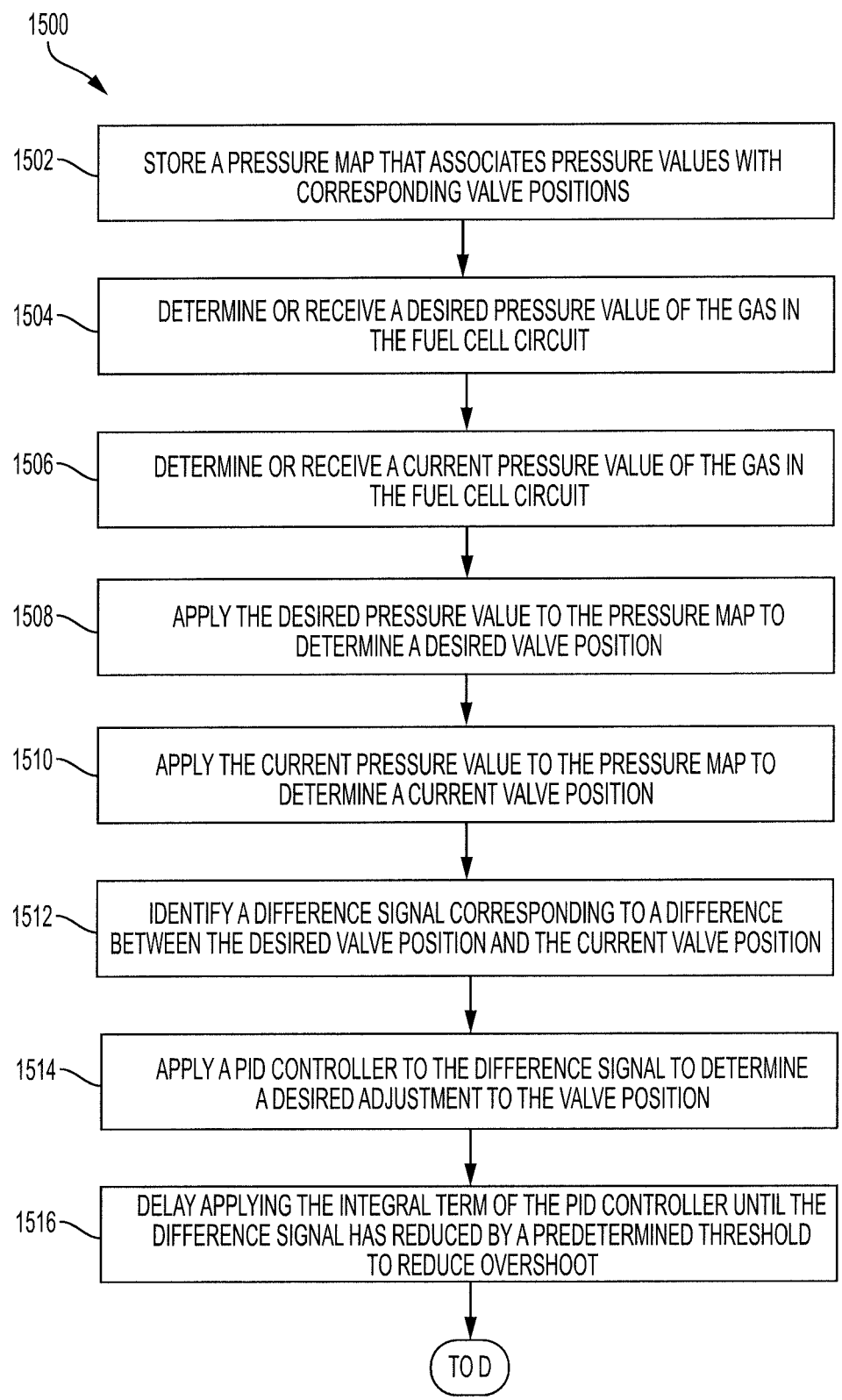
FIGS. 15A and 15B are flowcharts illustrating a method for feedback control of a valve of a fuel cell circuit according to an embodiment of the present invention.
Figure 15B:
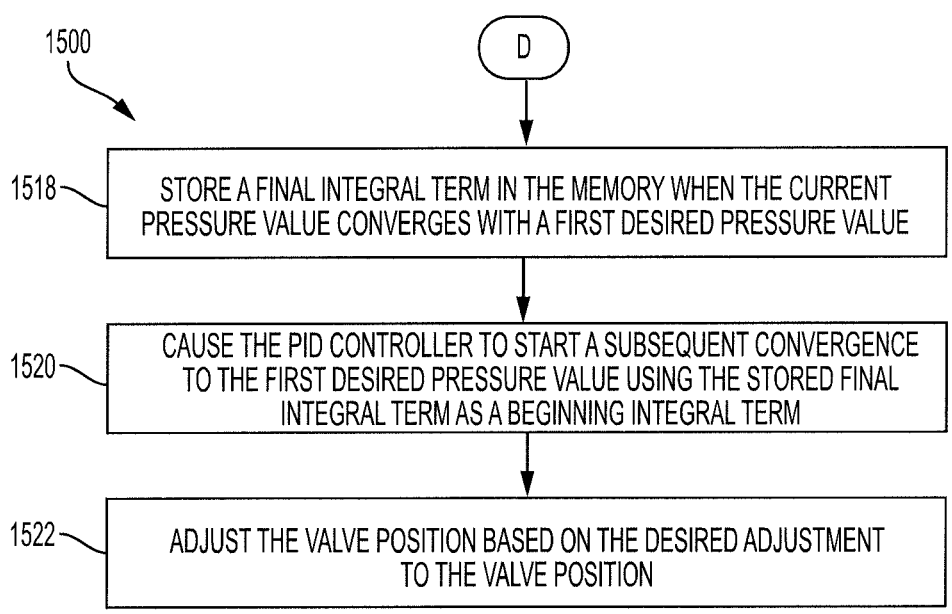

Referring now to FIGS. 2, 4, 16A, and 17A, a control 1700 may be used by the ECU 102 to perform feedback control of the restriction valve 214 using a method similar to the method 1500 of FIGS. 15A and 15B.

In the control 1700, the ECU 102 may receive or determine a target fuel cell pressure 1702 corresponding to a target or desirable pressure at the outlet 246 of the fuel cell stack 208. For example, the target fuel cell pressure 1702 may be determined by the state mediator 400. The ECU 102 may further determine or receive a current fuel cell pressure 1704 corresponding to a current pressure at the outlet 246 of the fuel cell stack 208. For example, the current fuel cell pressure 1704 may be received from the state estimator 406.

The ECU 102 may then pass the target fuel cell pressure 1702 through the first pressure map 1600 to determine a target or desired valve position 1706 that corresponds to the target fuel cell pressure 1702. The ECU 102 may likewise pass the current fuel cell pressure 1704 through the first pressure map 1600 to determine a current valve position 1708 that corresponds to the current fuel cell pressure 1704.

The target or desired valve position 1706 and the current valve position 1708 may be received by a difference block 1710. The difference block 1710 may identify a difference between the target or desired valve position 1706 and the current valve position 1708, and may output the difference as a different signal 1712.

The different signal 1712 may be received by a PID controller 1714. The PID controller 1714 may analyze past and present values of the difference signal and generate a feedback adjustment signal 1716 that corresponds to a desired adjustment to the valve position of the restriction valve 214.

Referring now to FIGS. 2, 4, 16B, and 17B, a control 1750 may be used by the ECU 102 to perform feedback control of the restriction valve 214 using a method similar to the method 1500 of FIGS. 15A and 15B.

In the control 1750, the ECU 102 may receive or determine a target bypass valve pressure ratio 1752 corresponding to a target or desirable pressure ratio across the bypass valve 212. For example, the target bypass valve pressure ratio 1752 may be determined by the state mediator 400. The ECU 102 may further determine or receive a current bypass valve pressure ratio 1754 corresponding to a current pressure ratio across the bypass valve 212. For example, the current bypass valve pressure ratio 1754 may be received from the state estimator 406.

The ECU 102 may then pass the target bypass valve pressure ratio 1752 through the second pressure map 1615 to determine a target or desired valve position 1756 that corresponds to the target bypass valve pressure ratio 1752. The ECU 102 may likewise pass the current bypass valve pressure ratio 1754 through the second pressure map 1650 to determine a current valve position 1758 that corresponds to the current bypass valve pressure ratio 1754.

The target or desired valve position 1756 and the current valve position 1758 may be received by a difference block 1760. The difference block 1760 may identify a difference between the target or desired valve position 1756 and the current valve position 1758, and may output the difference as a different signal 1762.

The different signal 1762 may be received by a PID controller 1764. The PID controller 1764 may analyze past and present values of the error signal and generate a feedback adjustment signal 1766 that corresponds to a desired adjustment to the valve position of the bypass valve 212.

Returning reference to FIGS. 2, 4, 15A, and 15B and in block 1516, the ECU 102 may delay applying the integral term of the PID controller until the different signal has reduced by a predetermined threshold in order to reduce overshoot of the desired adjustment due to a phenomena called integral windup. Sometimes, when a difference signal is relatively large, the integral term may be very large initially, along with the proportional term. As the difference signal approaches 0, the proportional term shrinks but the integral term remains relatively large. Thus, the initial large size of the integral term may sufficiently accumulate to overshoot the desired adjustment.

By delaying application of the integral term of the PID controller, the integral term may be introduced when the difference signal is relatively small. In that regard, the predetermined threshold may correspond to a threshold difference below which integral windup is unlikely to occur. In that regard, block 1516 may be referred to as integral windup protection, and may be optional within the method 1500.

In addition to, or instead of, performing the integral windup protection, the ECU 102 may implement what may be referred to as "learning values" in blocks 1518 and 1520. In particular and in block 1518, when the difference signal converges to or near 0 (i.e., when the current pressure value is substantially equal to the desired pressure value) for a given target pressure value, then the ECU 102 may store the final integral term from the PID controller in a memory.

In block 1520, during a subsequent convergence towards the same given target pressure value, the ECU 102 may cause the PID controller to begin the convergence using the stored final integral term. By storing the final integral term, each convergence towards the same given target pressure value is likely to begin with an integral term (i.e., the stored final integral term) that is relatively close to a value that is likely to provide relatively quick and accurate convergence towards the given target pressure value.

In block 1522, the ECU 102 may adjust the corresponding valve (i.e., the restriction valve 214 or the bypass valve 212) based on the desired adjustment to the valve position. In some embodiments, the ECU 102 may add the desired adjustment to the valve position to a feedforward control signal and control the corresponding valve based on the results of the addition. In some embodiments, the ECU 102 may simply adjust the control of the corresponding valve using the desired adjustment to the valve position.

Referring now to FIGS. 2, 4, 18A, and 18B, a method 1800 may be used by the ECU 102, such as in the feedforward or feedback control 416, to perform a feedback control of the compressor 204. In particular, the ECU 102 may compare the current and target values and identify a feedback control signal based on a difference between the current and target values. For example, the values may include a total airflow through the compressor 204.

Figure 19:
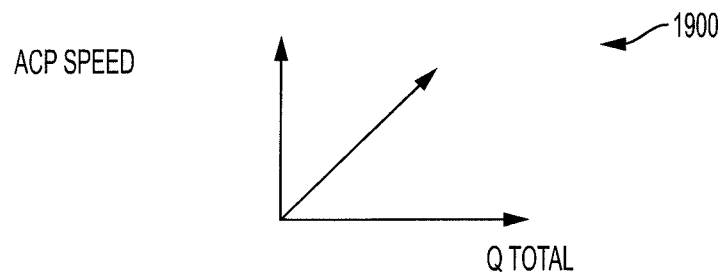
FIG. 19 is an airflow map used in the method of FIGS. 18A and 18B according to an embodiment of the present invention.

In particular and in block 1802, the ECU 102 may store an airflow map that associates airflow values with corresponding compressor speeds. For example and referring to FIGS. 2 and 19, an airflow map 1900 associates airflow through the compressor 204 (along the X axis) with a compressor speed (along the Y axis). In that regard, a compressor speed corresponding to a speed of the compressor 204 may be retrieved from the airflow map 1900 based on a received airflow value.

Returning reference to FIGS. 2, 4, 18A, and 18B and in block 1804, the ECU 102 may determine or receive a desired compressor flow rate corresponding to a total airflow through the compressor 204. In block 1806, the ECU 102 may determine or receive a current compressor flow rate.

In block 1808, the ECU 102 may apply the desired compressor flow rate to the airflow map to determine a desired compressor speed. In block 1810, the ECU 102 may apply the current compressor flow rate to the airflow map to determine a current compressor speed.

In block 1812, the ECU 102 may compare the current compressor speed to the target compressor speed to identify a different signal corresponding to a difference between the current compressor speed and the target compressor speed.

In block 1814, the ECU 102 may apply a PID controller to the different signal to determine a desired adjustment to the compressor speed.

Figure 18A:
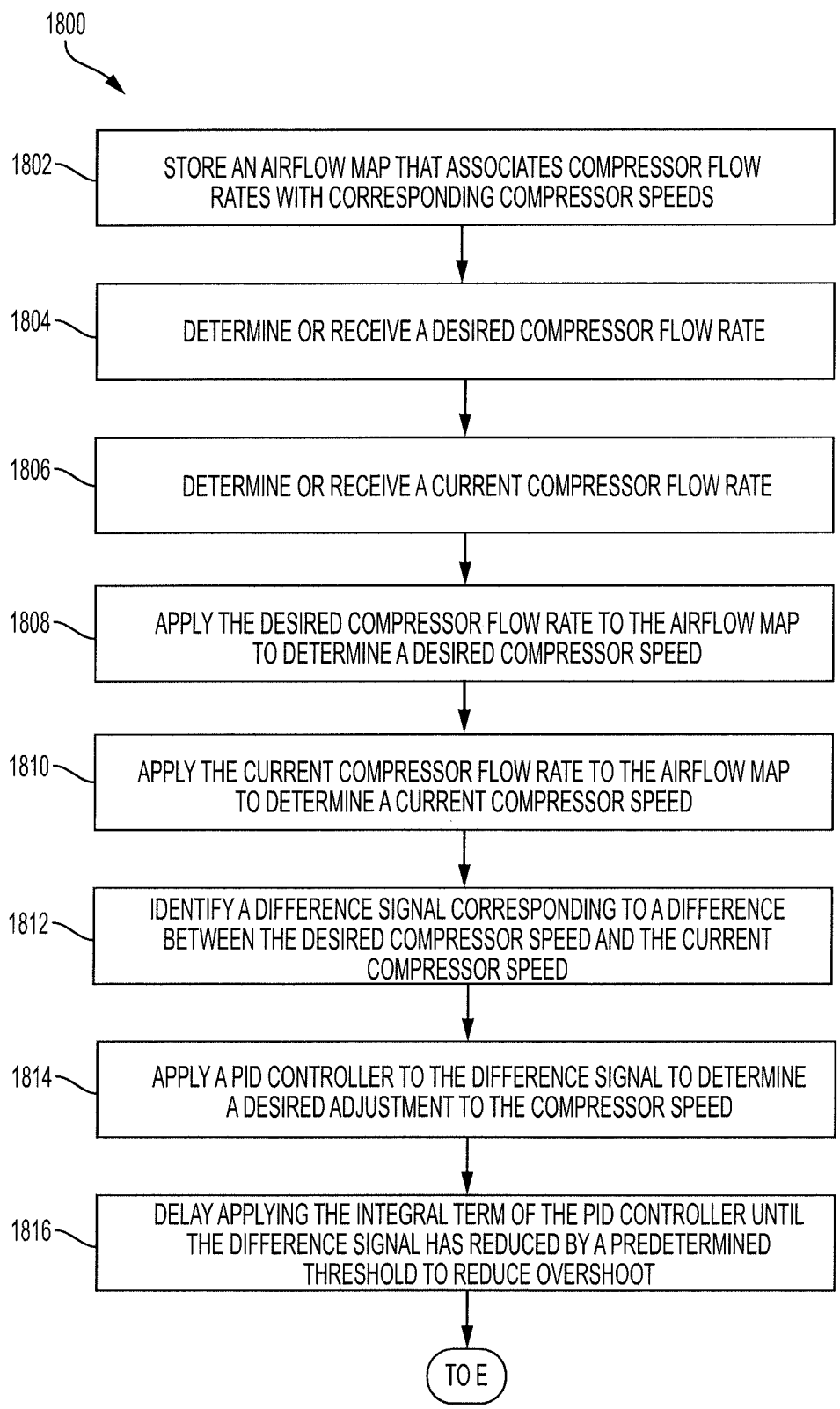
FIGS. 18A and 18B are flowcharts illustrating a method for feedback control of a compressor of a fuel cell circuit according to an embodiment of the present invention.
Figure 18B:
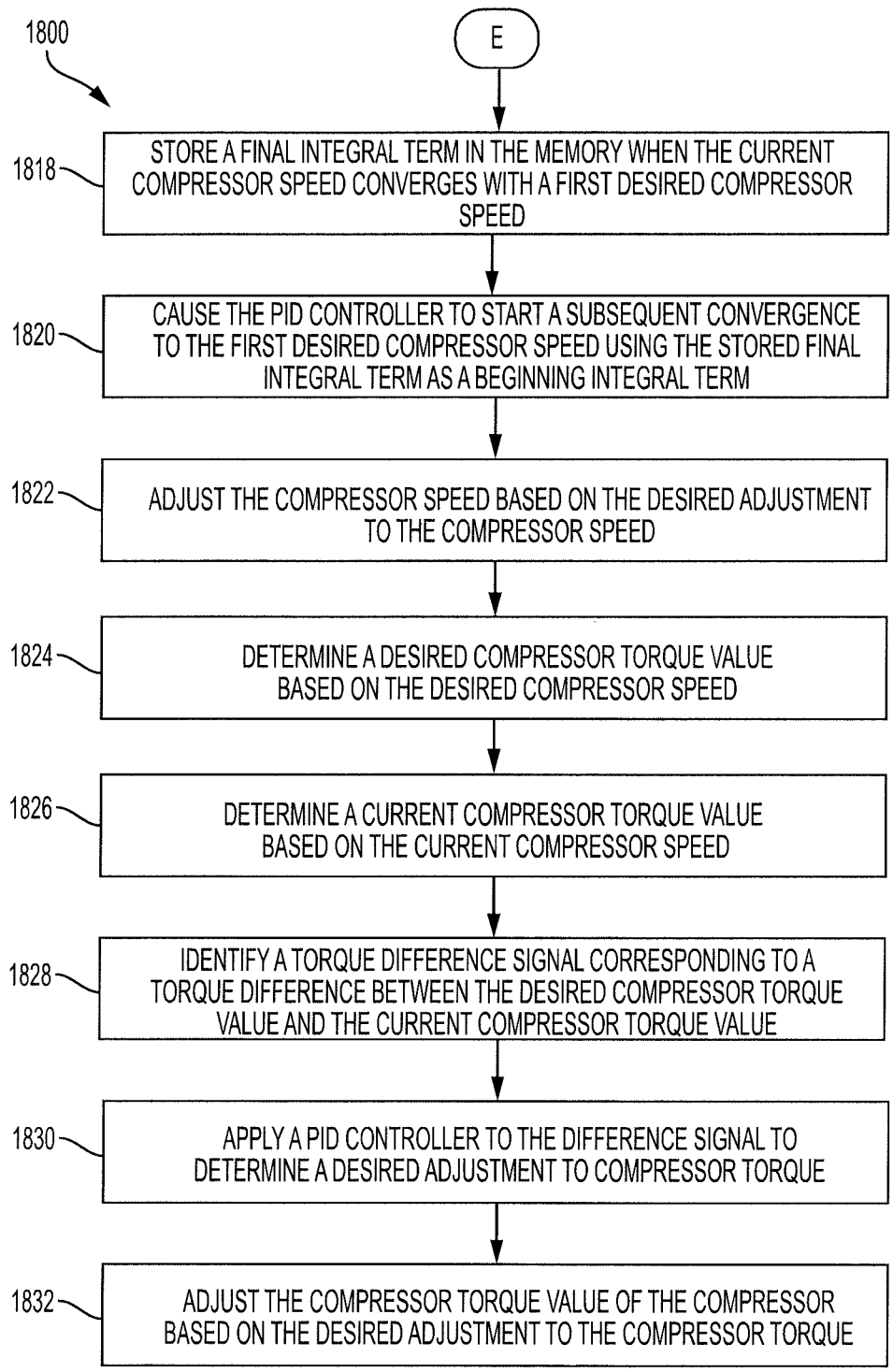

Referring now to FIGS. 2, 4, 19, and 20A, a control 2000 may be used by the ECU 102 to perform feedback control of the compressor speed of the compressor 204 using a method similar to the method 1800 of FIGS. 18A and 18B.

In the control 2000, the ECU 102 may receive or determine a target total compressor airflow 2002 corresponding to a target or desirable total flow of the gas through the compressor 204. For example, the target total compressor airflow 2002 may be determined by the state mediator 400. The ECU 102 may further determine or receive a current total compressor airflow 2004 corresponding to current total flow through the compressor 204. For example, the current total compressor flow 2004 may be received from the state estimator 406.

The ECU 102 may then pass the target total compressor flow 2002 through the airflow map 1900 to determine a target or desired compressor speed 2006 that corresponds to the target total compressor airflow 2002. The ECU 102 may likewise pass the current total compressor flow 2004 through the airflow map 1900 to determine a current compressor speed 2008 that corresponds to the current total compressor airflow 2004.

The target or desired compressor speed 2006 and the current compressor speed 2008 may be received by a difference block 2010. The difference block 2010 may identify a difference between the target or desired compressor speed 2006 and the current compressor speed 2008, and may output the difference as a difference signal 2012.

The difference signal 2012 may be received by a PID controller 2014. The PID controller 2014 may analyze past and present values of the difference signal 2012 and may generate a feedback speed adjustment signal 2016 that corresponds to a desired adjustment to the compressor speed of the compressor 204.

Returning reference to FIGS. 2, 4, 18A, and 18B and in block 1816, the ECU 102 may delay applying the integral term of the PID controller until the different signal has reduced by a predetermined threshold in order to reduce overshoot of the desired adjustment due to integral windup. This may be performed in a similar manner as block 1516 of FIGS. 15A and 15B.

In addition to, or instead of, performing the integral windup protection, the ECU 102 may implement "learning values" in blocks 1818 and 1820. This may be performed in a similar manner as block 1518 and 1520 of FIGS. 15A and 15B.

In block 1822, the ECU 102 may adjust the compressor speed based on the desired adjustment to the compressor speed. This may be performed in a similar manner as block 1522 of FIGS. 15A and 15B.

As described above, the compressor 204 may have a compressor speed and a compressor torque which may be controlled separately. In that regard, blocks 1824 through 1830 may be used to control the compressor torque of the compressor 204.

The compressor speed and compressor torque may be related such that the compressor torque may be directly proportional to the compressor speed. In that regard and in block 1824, the ECU 102 may determine a desired compressor torque value based on the desired compressor speed. For example, the desired compressor speed may be determined in block 1808. In order to determine the desired compressor torque, the desired compressor speed may be applied to a map, in a similar manner as the compressor speed is determined based on total air flow. However, due to the proportional relationship between the torque and speed of the compressor 204, a proportional gain may be applied to the desired compressor speed to obtain the desired compressor torque.

Likewise, in block 1826, the ECU 102 may determine a current compressor torque value based on the current compressor speed. The current compressor speed may be determined in block 1810. The ECU 102 may determine the current compressor torque either using a map or using a proportional gain, as described above with reference to block 1824.

In block 1828, the ECU 102 may identify a torque difference signal corresponding to a torque difference between the desired compressor torque value and the current compressor torque value.

In block 1830, the ECU 102 may apply a PID controller to the different signal to determine a desired adjustment to the compressor torque.

In some embodiments, the ECU 102 may implement one or both of integral windup protection or "learning values."

In block 1832, the ECU 102 may adjust the compressor torque value of the compressor based on the desired adjustment to the compressor torque.

Figure 20A:
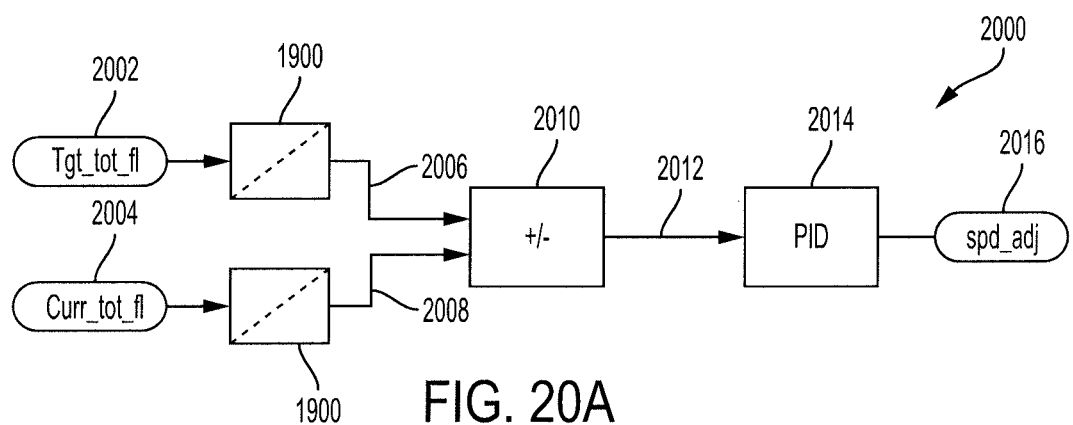
FIGS. 20A and 20B are block diagrams illustrating control circuits for implementing the method of FIGS. 18A and 18B according to an embodiment of the present invention.
Figure 20B:
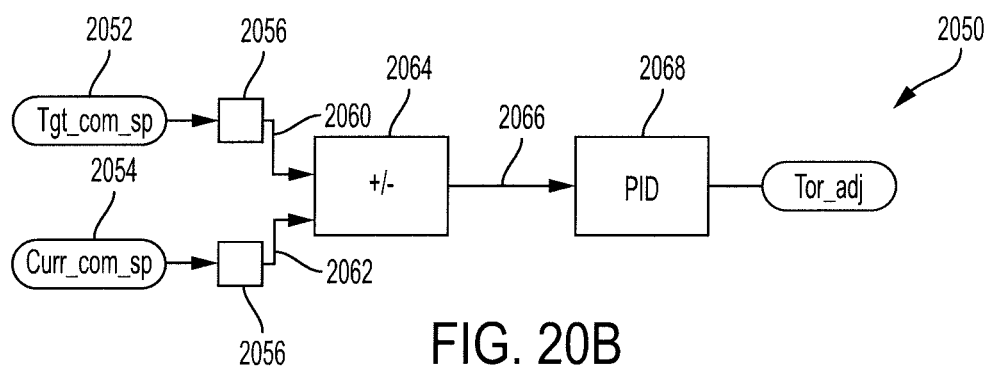

Referring now to FIGS. 2, 4, and 20B, a control 2050 may be used by the ECU 102 to perform feedback control of the compressor torque of the compressor 204 using a method similar to the method 1800 of FIGS. 18A and 18B.

In the control 2050, the ECU 102 may determine a target or desired compressor speed 2052 along with a current compressor speed 2054. These values may be determined or received from any of the feedforward and feedback control 416, the state estimator 406, or the path controller 412.

The ECU 102 may then pass the target compressor speed 2052 through a function 2056 to determine a target or desired compressor torque 2060. The function 2056 may include a map or a calculation, such as a calculation to apply a proportional gain to the target compressor speed 2052. The ECU 102 may likewise pass the current compressor speed 2054 through the function 2056 to determine a current compressor torque 2062.

The target or desired compressor torque 2060 and the current compressor torque 2062 may be received by a difference block 2064. The difference block 2064 may identify a torque difference signal 2066 that corresponds to a difference between the target or desired compressor torque 2060 and the current compressor torque 2062.

The torque difference signal 2066 may be received by a PID controller 2068. The PID controller 2068 may analyze past and present values of the torque difference signal 2066 and may generate a feedback torque adjustment signal 2070 that corresponds to a desired adjustment to the compressor torque of the compressor 204.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling airflow through a fuel cell circuit comprising:
   a compressor configured to pump a gas through the fuel cell circuit at a compressor flow rate;
   a fuel cell stack having a plurality of fuel cells and configured to receive the gas and to generate electricity via a chemical reaction with the gas;
   a memory configured to store a compressor flow map corresponding to a desirable progression shape of the compressor flow rate from a starting compressor flow rate to a target compressor flow rate over a period of time; and
   an electronic control unit (ECU) coupled to the compressor and configured to:
      determine or receive a control signal corresponding to a final target compressor flow rate,
      determine the starting compressor flow rate,
      determine an intermediate target compressor flow rate using the compressor flow map based on the final target compressor flow rate, the starting compressor flow rate, and an amount of time since determining or receiving the control signal, and
      control the compressor based on the intermediate target compressor flow rate.

2. The system of claim 1 wherein:
   the compressor includes an inlet and an outlet such that a compressor pressure ratio corresponds to a ratio of outlet pressure at the outlet to inlet pressure at the inlet;
   the memory is further configured to store a compressor pressure ratio map corresponding to a desirable progression shape of the compressor pressure ratio from a starting compressor pressure ratio to a target compressor pressure ratio based on a completion percentage of the compressor flow rate from the starting compressor flow rate to the target compressor flow rate; and
   the ECU is further configured to:
      receive or determine a final target compressor pressure ratio,
      determine the starting compressor pressure ratio,
      determine the completion percentage of the compressor flow rate,
      determine an intermediate target compressor pressure ratio based on the compressor pressure ratio map, the final target compressor pressure ratio, the starting compressor pressure ratio, and the completion percentage of the compressor flow rate; and
      further control the compressor based on the intermediate target compressor pressure ratio.

3. The system of claim 2 wherein the compressor flow map plots the desirable progression shape of the compressor flow rate as the completion percentage from zero percent to one hundred percent over the period of time, and the ECU is further configured to determine the intermediate target compressor flow rate by multiplying a current completion percentage of the compressor flow rate by a difference between the final target compressor flow rate and the starting compressor flow rate and adding the starting compressor flow rate to the result of the multiplication.

4. The system of claim 3 wherein the current completion percentage is determined by comparing the amount of time since determining or receiving the control signal to the compressor flow map.

5. The system of claim 2 wherein the compressor pressure ratio map plots the desirable progression shape of the compressor pressure ratio as a pressure completion percentage from zero percent to one hundred percent over the completion percentage of the compressor flow rate, and the ECU is further configured to determine the intermediate target compressor pressure ratio by multiplying a current pressure completion percentage of the compressor pressure ratio by a difference between the final target compressor pressure ratio and the starting compressor pressure ratio and adding the starting compressor pressure ratio to the result of the multiplication.

6. The system of claim 5 wherein the current pressure completion percentage is determined by comparing the completion percentage of the compressor flow rate to the compressor pressure ratio map.

7. The system of claim 1 wherein:
the memory is further configured to store a speed map that associates compressor flow rates and compressor pressure ratios with compressor speeds, the speed map including a first path and a second path that both extend from a zero speed to a maximum speed,
the compressor flow map includes a first compressor flow map that corresponds to the first path and a second compressor flow map that corresponds to the second path; and
the ECU is further configured to:
determine a current compressor flow rate,
interpolate a normalized compressor flow value by interpolating the current compressor flow rate between the first path and the second path,
create an interpolated compressor flow map by interpolating between the first compressor flow map and the second compressor flow map based on the normalized compressor flow value, and
further determine the intermediate target compressor flow rate using the interpolated compressor flow map.

8. The system of claim 1 further comprising a valve configured to adjust a fuel cell flow rate of the gas through the fuel cell stack, wherein:
the memory is further configured to store a fuel cell flow rate map corresponding to a desirable progression shape of the fuel cell flow rate from any starting fuel cell flow rate to any target fuel cell flow rate based on a completion percentage of the compressor flow rate from the starting compressor flow rate to the target compressor flow rate; and
the ECU is further configured to:
determine the completion percentage of the compressor flow rate,
determine an intermediate target fuel cell flow rate based on the fuel cell flow rate map and the completion percentage of the compressor flow rate, and
control the valve based on the intermediate target fuel cell flow rate.

9. The system of claim 1 wherein:
the compressor is configured to operate at a compressor torque;
the memory is further configured to store a compressor torque map corresponding to a desirable progression shape of the compressor torque from any starting compressor torque to any target compressor torque based on a completion percentage of the compressor flow rate from the starting compressor flow rate to the target compressor flow rate; and
the ECU is further configured to:
determine the completion percentage of the compressor flow rate,
determine an intermediate target compressor torque based on the compressor torque map and the completion percentage of the compressor flow rate, and
further control the compressor based on the intermediate target compressor torque.

10. The system of claim 1 wherein the compressor flow map includes at least two normalized compressor flow maps including a first normalized compressor flow map corresponding to an increasing compressor flow rate and a second normalized compressor flow map corresponding to a decreasing compressor flow rate, and wherein the ECU is further configured to select which of the at least two normalized compressor flow maps to use to determine the intermediate target compressor flow rate based on whether the final target compressor flow rate is greater than or less than the starting compressor flow rate.

11. A system for controlling airflow through a fuel cell circuit comprising:
a plurality of actuators configured to adjust a flow rate and a pressure of a gas within the fuel cell circuit;
a fuel cell stack having a plurality of fuel cells and configured to receive the gas and to generate electricity via a chemical reaction with the gas;
a memory configured to store:
a reference state map corresponding to a desirable progression shape of a reference state of the fuel cell circuit over a period of time, the reference state corresponding to at least one of the flow rate or the pressure of the gas, and
a follower state map corresponding to a desirable progression shape of a follower state of the fuel cell circuit over a completion percentage of the reference state, the follower state corresponding to at least one of the flow rate or the pressure of the gas; and
an electronic control unit (ECU) coupled to the plurality of actuators and the memory and configured to:
determine or receive a target reference state value and a target follower state value,
determine a starting reference state value and a starting follower state value,
determine an intermediate target reference state value based on the reference state map, an amount of time elapsed since the target reference state value was determined or received, the target reference state value, and the starting reference state value, and
determine an intermediate target follower state value based on the follower state map, the completion percentage of the reference state, the target follower state value, and the starting follower state value.

12. The system of claim 11 wherein the reference state map is a normalized reference map and the ECU is further configured to determine the intermediate target reference state value by using the reference state map and the amount of time elapsed since the target reference state value was determined or received to determine a normalized reference state value, and then calculating the intermediate target reference state value based on the normalized reference state value, the target reference state value, and the starting reference state value.

13. The system of claim 12 wherein the follower state map is a normalized follower map and the ECU is further configured to determine the intermediate target follower state value by using the follower state map and the normalized reference state value to determine a normalized follower state value, and then calculating the intermediate target follower state value based on the normalized follower state value, the target follower state value, and the starting follower state value.

14. The system of claim 11 wherein the reference state map is an interpolated reference state map that was interpolated between a first reference state map and a second reference state map based on the starting reference state value.

15. The system of claim 11 wherein:
the plurality of actuators includes a compressor having an inlet and an outlet and configured to propel the gas through the fuel cell circuit;

the reference state is a compressor flow rate corresponding to a flow rate of the gas through the compressor; and the follower state is at least one of a compressor pressure ratio corresponding to a ratio of pressure of the gas at the outlet of the compressor to pressure of the gas at the inlet of the compressor, a fuel cell flow rate corresponding to a flow rate of the gas through the fuel cell stack, or a compressor acceleration corresponding to an acceleration rate of the compressor.

16. The system of claim 11 wherein the ECU is further configured to control at least one of the plurality of actuators based on the intermediate target reference state value and the intermediate target follower state value.

17. A method for controlling airflow through a fuel cell circuit, comprising:
storing, in a memory, a compressor flow map corresponding to a desirable progression shape of a compressor flow rate of a compressor from a starting compressor flow rate to a target compressor flow rate over a period of time;
determining or receiving, by an electronic control unit (ECU), a control signal corresponding to a final target compressor flow rate;
determining, by the ECU, the starting compressor flow rate;
determining, by the ECU, an intermediate target compressor flow rate using the compressor flow map based on the final target compressor flow rate, the starting compressor flow rate, and an amount of time since determining or receiving the control signal; and
controlling, by the ECU, the compressor based on the intermediate target compressor flow rate.

18. The method of claim 17 further comprising:
storing, in the memory, a compressor pressure ratio map corresponding to a desirable progression shape of a compressor pressure ratio from a starting compressor pressure ratio to a target compressor pressure ratio based on a completion percentage of the compressor flow rate from the starting compressor flow rate to the target compressor flow rate;
determining or receiving, by the ECU, a final target compressor pressure ratio;
determining, by the ECU, the starting compressor pressure ratio;
determining, by the ECU, an intermediate target compressor pressure ratio based on the final target compressor pressure ratio, the starting compressor pressure ratio, and the completion percentage of the compressor flow rate; and
further controlling, by the ECU, the compressor based on the intermediate target compressor pressure ratio.

19. The method of claim 17 further comprising:
storing, in the memory, a speed map that associates compressor flow rates and compressor pressure ratios with compressor speeds, the speed map including a first path and a second path that both extend from a zero speed to a maximum speed,
determining, by the ECU, a current compressor flow rate;
interpolating, by the ECU, a normalized compressor flow value by interpolating the current compressor flow rate between the first path and the second path;
creating, by the ECU, an interpolated compressor flow map by interpolating between a first compressor flow map that corresponds to the first path and a second compressor flow map that corresponds to the second path based on the normalized compressor flow value; and
further determining, by the ECU, the intermediate target compressor flow rate using the interpolated compressor flow map.

20. The method of claim 17 further comprising:
storing, in the memory, a fuel cell flow rate map corresponding to a desirable progression shape of a fuel cell flow rate of gas through a fuel cell stack from any starting fuel cell flow rate to any target fuel cell flow rate based on a completion percentage of the compressor flow rate from the starting compressor flow rate to the target compressor flow rate;
determining, by the ECU, the completion percentage of the compressor flow rate;
determining, by the ECU, an intermediate target fuel cell flow rate based on the completion percentage of the compressor flow rate; and
controlling, by the ECU, a valve of the fuel cell circuit based on the intermediate target fuel cell flow rate.

* * * * *

UNITED STATES PATENT AND TRADEMARK OFFICE
CERTIFICATE OF CORRECTION

PATENT NO. : 10,665,875 B2
APPLICATION NO. : 15/836740
DATED : May 26, 2020
INVENTOR(S) : Jared Farnsworth, Daniel Folick and Shigeki Hasegawa It is certified that error appears in the above-identified patent and that said Letters Patent is hereby corrected as shown below:

On the Title Page

Item (72), correct inventorship to read as follows:
(72) Inventors: Jared Farnsworth, Roseville, CA (US);
Daniel Folick, Long Beach, CA (US);
Shigeki Hasegawa, Aichi-ken (JP)

Signed and Sealed this
Second Day of April, 2024

Katherine Kelly Vidal
*Director of the United States Patent and Trademark Office*